US008516050B1

(12) United States Patent
Chapweske et al.

(10) Patent No.: US 8,516,050 B1
(45) Date of Patent: Aug. 20, 2013

(54) METHODS AND PROGRAM PRODUCTS FOR COMMUNICATING FILE MODIFICATIONS DURING A COLLABORATION EVENT

(75) Inventors: Adam M. Chapweske, Minneapolis, MN (US); Jon N. Swanson, Queensbury, NY (US)

(73) Assignee: Insors Integrated Communications, Chicago, IL (US)

( * ) Notice: Subject to any disclaimer, the term of this patent is extended or adjusted under 35 U.S.C. 154(b) by 867 days.

(21) Appl. No.: 12/150,705

(22) Filed: Apr. 30, 2008

Related U.S. Application Data

(63) Continuation-in-part of application No. 11/903,915, filed on Sep. 25, 2007, now Pat. No. 8,144,632, and a continuation-in-part of application No. 11/477,069, filed on Jun. 28, 2006, and a continuation-in-part of application No. 11/477,169, filed on Jun. 2, 2006, now Pat. No. 8,023,437.

(60) Provisional application No. 60/847,061, filed on Sep. 25, 2006.

(51) Int. Cl.
*G06F 15/16* (2006.01)
*G06F 12/00* (2006.01)

(52) U.S. Cl.
USPC .......................................... 709/204; 709/250

(58) Field of Classification Search
USPC ......... 709/203–205, 213, 217–218, 225–229, 709/250
See application file for complete search history.

(56) References Cited

U.S. PATENT DOCUMENTS

| 5,353,283 | A | 10/1994 | Tsuchiya |
| 5,479,654 | A | 12/1995 | Squibb |
| 6,006,239 | A | 12/1999 | Bhansali et al. |
| 6,128,644 | A | 10/2000 | Nozaki |
| 6,195,680 | B1 | 2/2001 | Goldszmidt et al. |
| 6,317,777 | B1 * | 11/2001 | Skarbo et al. ................. 709/204 |
| 6,587,827 | B1 | 7/2003 | Hennig et al. |
| 6,636,889 | B1 * | 10/2003 | Estrada et al. ................ 709/203 |
| 6,725,284 | B2 | 4/2004 | Arndt |
| 6,728,221 | B1 | 4/2004 | Shaffer et al. |
| 6,728,784 | B1 | 4/2004 | Mattaway |
| 6,760,309 | B1 | 7/2004 | Rochberger et al. |
| 6,870,916 | B2 | 3/2005 | Henrikson et al. |

(Continued)

OTHER PUBLICATIONS

M. Humphrey et al. "State and Events for Web Services: A Comparison of Five WS-Resource Framework and WS-Notification Implementations," 14*th* *IEEE International Symposium on High Performance Distributed Computing (HPDC-14)*. Research Triangle Park, NC, 24-27 (Jul. 2005).

(Continued)

*Primary Examiner* — Zarni Maung
(74) *Attorney, Agent, or Firm* — Greer, Burns & Crain, Ltd

(57) ABSTRACT

One example method for communicating a file modification during a collaboration event includes steps of a first computer communicating a file modification status request to a second computer, the status request including at least a file identifier and a file property. The second computer uses the file identifier from the request to identify a current property of a corresponding file. The second computer compares the current file property to the file property from the status request and communicates a response to the first computer when the current property does not match the property from the status request.

21 Claims, 15 Drawing Sheets

(56) References Cited

U.S. PATENT DOCUMENTS

| | | | |
|---|---|---|---|
| 6,965,614 | B1 | 11/2005 | Osterhout et al. |
| 7,277,901 | B2 * | 10/2007 | Parker et al. ............... 707/203 |
| 7,317,695 | B2 | 1/2008 | Mayer et al. |
| 7,561,522 | B1 | 7/2009 | Cotter |
| 2002/0128065 | A1 * | 9/2002 | Chung et al. .................. 463/42 |
| 2003/0108002 | A1 | 6/2003 | Chaney et al. |
| 2003/0126291 | A1 | 7/2003 | Wang et al. |
| 2003/0204693 | A1 | 10/2003 | Moran et al. |
| 2004/0111472 | A1 | 6/2004 | Swanson et al. ............. 709/204 |
| 2004/0117446 | A1 | 6/2004 | Swanson ...................... 709/205 |
| 2004/0201668 | A1 | 10/2004 | Matsubara et al. |
| 2004/0210637 | A1 | 10/2004 | Loveland |
| 2004/0230895 | A1 | 11/2004 | Elza et al. |
| 2004/0230896 | A1 | 11/2004 | Elza et al. |
| 2005/0004978 | A1 | 1/2005 | Reed et al. |
| 2005/0022204 | A1 | 1/2005 | Kabir et al. |
| 2005/0044503 | A1 | 2/2005 | Richardson et al. |
| 2005/0076098 | A1 | 4/2005 | Matsubara et al. |
| 2006/0039335 | A1 | 2/2006 | Ono et al. |
| 2006/0053380 | A1 | 3/2006 | Spataro et al. |
| 2006/0101064 | A1 * | 5/2006 | Strong et al. .................. 707/102 |
| 2006/0104221 | A1 | 5/2006 | Norton |
| 2006/0268695 | A1 | 11/2006 | Dhesikan et al. |
| 2007/0005711 | A1 | 1/2007 | Hassounah et al. |
| 2007/0050448 | A1 * | 3/2007 | Gonen et al. .................. 709/204 |
| 2007/0168524 | A1 | 7/2007 | Chao et al. |
| 2007/0201365 | A1 | 8/2007 | Skoog et al. |
| 2007/0217589 | A1 | 9/2007 | Martin et al. |
| 2009/0117927 | A1 | 5/2009 | Li et al. |

OTHER PUBLICATIONS

"The Role of the Globus Toolkit® in the Grid Ecosystem," The Globus Alliance, published on the World Wide Web at http://www.globus.org/grid_software/role-of-gt.php, (believed published circa 2005).

"An Ecosystem of Grid Components," The Globus Alliance, published on the World Wide Web at http://www.globus.org/grid_software/ecology.php, (believed published circa 2005).

"About the Globus Toolkit," The Globus Alliance, published on the World Wide Web at www.globus.org/toolkit/about.html; (believed published circa 2005).

Ian Foster et al. "A Distributed Resource Management Architecture that Supports Advance Reservations and Co-Allocation," published on the World Wide Web at http://www.globus.org/alliance/publications/papers/iwqos.pdf#search=%22a%20distributed%20resource%20management%20architecture%22 (1999).

"Common Object Request Broker Architecture (CORBA) Manual v3.0; Chapters 1, 2" published on the World Wide Web at http://www.omg.org/docs/formal/02-06-05.pdf (Jul. 2002).

"CORBA® Basics", Object Management Group, Inc., Published on the world wide web at: http://www.omg.org/gettingstarted/corbafaq.htm (believed published circa 1996-2006).

Warren Smith, Ian Foster, Valerie Taylor, "Scheduling with Advanced Reservations," International Parallel and Distributed Processing Symposium (IPDPS '00), (2000).

Karl Czajkowski, Ian Foster, Carl Kesselman, "Resource Co-Allocation in Computational Grids" (HPDC) (1999).

Warren Smith, Valerie Taylor, Ian Foster, "Using Run-Time Predictions to Estimate Queue Wait Times and Improve Scheduler Performance," Published on the world wide web at: http://www.globus.org/alliance/publications/papers/p.pdf#search=%22using%20run-time%20predictions%20to%20estimate%20queue%22 (1999).

W3C, "SOAP Version 1.2 Part 0: Primer," W3C Recommendation, published on the world wide web at: http://www.w3.org/TR/soap12-part0/ (Jun. 2003).

Tarak Modi, "Clean up your wire protocol with SOAP, Part 1: An introduction to SOAP basics," published on the world wide web at: http://www.javaworld.com/javaworld/jw-03-2001/jw-0330-soap.html (Mar. 2001).

Joseph M. Jacob, "CORBA/e: Not Your Father's Distributed Architecture," published on the web at: http://www.elecdesign.com/Articles/Index.cfm?AD=1&ArticleID=12702 (Jun. 2006).

Don Box, "A Young Person's Guide to the Simple Object Access Protocol: SOAP Increases Interoperability Across Platforms and Languages," published on the web at: http://msdn.microsoft.com/msdnmag/issues/0300/soap/soap.asp; (believed published circa 2000).

Li Qi, Hai Jin et al., "HAND: Highly Available Dynamic Deployment Infrastructure for Globus Toolkit 4," published on the world wide web at: http://www.globus.org/alliance/publications/papers/HAND-Submitted.pdf - search=%22hand%3A%20highly%20available%2 (believed published circa Jun. 2006).

Ann Chervenak, Ian Foster et al. "The Data Grid: Towards an Architecture for the Distributed Management and Analysis of Large Scientific Datasets," published on the web at: http://loci.cs.utk.edu/dsi/netstore99/docs/papers/chervenak.pdf -search=%22the%20data%20grid%3A%20towards (1999).

Ian Foster, Carl Kesselman, Steven Tuecke, "The Anatomy of the Grid," published on the world wide web at: http://www.globus.org/alliance/publications/papers/anatomy.pdf; (2001).

Ian Foster, "Globus Toolkit Version 4: Software for Service-Oriented Systems," IFIP International Federation for Information Processing (2005).

Ian Foster, Carl Kesselman et al., "Grid Services for Distributed System Integration," IEEE, 2002.

Paul Z. Kolano, "Surfer: An Extensible Pull-Based Framework for Resource Selection and Ranking" In *Proc. of the 4th IEEE/ACM Intl. Symp. on Cluster Computing and the Grid*, (2004).

"AJAX Examples and Tutorials, What can we do with AJAX?", published on the web at: http://www.ajaxexample.com/page.cfm/id/27241, publication believed circa 2007, author unknown.

"AJAX Examples and Tutorials, What is AJAX?", published on the web at: http://www.ajaxexample.com/page.cfm/id/27240, publication believed circa 2007, author unknown.

"AJAX", published at on the web at: http://en.wikipedia.org/wiki/AJAX, believed published circa 2007, authors unknown.

"Why AJAX COMET?", published on the web at: http://www.webtide.com/downloads/whitePaperWhyAjax.html; by Greg Wilkens; Jul. 2006.

"COMET (programming)", at on the web at: http://en.wikipedia.org/wiki/COMET, believed published circa 2007, authors unknown.

Rosenberg et al., "SIP: Session Initiation Protocol," Network Working Group Request for Comments: 3261, Jun. 2002, pp. 1-269.

Schulzrinne et al., "DHCP Options for SIP servers," Network Working Group Request for Comments: 3319 Jul. 2003, pp. 1-7.

Fielding et al., "Hyper Text Transfer Protocol," Network Working Group Request for Comments: 2616, Jun. 1999, pp. 1, 53.

Postel, "Internet Control Message Protocol," Network Working Group Request for Comments: 792, Sep. 1981, pp. 1-21.

Mockapetris, "Domain Names—Concepts and Facilities," Network Working Group Request for Comments: 1034, Nov. 1987, pp. 1-55.

USPTO Office Action dated Jan. 22, 2010, which issued in co-pending U.S. Appl. No. 12/150,629.

USPTO Office Action dated Aug. 4, 2010, which issued in co-pending U.S. Appl. No. 12/150,619.

USPTO Office Action dated Sep. 1, 2010, which issued in co-pending U.S. Appl. No. 12/150,629.

* cited by examiner

| Today | Tomorrow | Thu | Fri | Sat |
|---|---|---|---|---|
| PM Showers | AM Clouds/PM Sun | Sunny | Mostly Sunny | Mostly Sunny |
| High: 56° Low: 50° | High: 53° Low: 44° | High: 59° Low: 46° | High: 64° Low: 50° | High: 69° Low: 50° |

| Financial Information | | | | | | |
|---|---|---|---|---|---|---|
| | | Latest Session | | 52-Week | | |
| Company | Symbol | Close | Net Chg | High | Low | % chg |
| AT&T Inc. | T | 37.59 | 0.08 | 42.97 | 32.95 | -5.5 |
| Altria Group Inc | MO | 22.16 | 0.06 | 24.55 | 19.47 | 3.6 |
| Amer Int'l Group | AIG | 46.54 | -1.69 | 72.97 | 38.50 | -33.1 |
| Bank of America | BAC | 37.61 | -0.95 | 52.96 | 33.12 | -25.5 |
| Bristol-Myers | BMV | 21.84 | -0.26 | 32.35 | 20.05 | -23.4 |
| CVX Caremark | CVS | 40.12 | -.046 | 42.60 | 34.80 | 14.3 |
| Chevron Corp | CVX | 92.70 | -0.48 | 95.50 | 76.40 | 19.5 |
| Cisco Systems | CSCO | 24.89 | 0.38 | 34.24 | 21.77 | -6.4 |
| Citigroup Inc | C | 25.03 | -0.08 | 55.55 | 17.99 | -52.9 |
| Coca-Cola Co | KO | 60.35 | 0.24 | 65.59 | 51.03 | 16.8 |
| Comcast Corp A | CMCSA | 20.22 | -0.06 | 29.41 | 16.11 | -26.9 |
| ConocoPhillips | COP | 84.34 | 0.45 | 90.84 | 67.85 | 19.5 |
| Corning Inc | GLW | 25.73 | 0.03 | 27.25 | 20.04 | 10.3 |
| Dell Inc | DELL | 19.56 | 0.09 | 30.77 | 18.13 | -21.3 |
| Disney(Walt) Co. | DIS | 31.46 | 0.13 | 36.30 | 26.30 | -9.1 |

| News Reports | |
|---|---|
| News Report 1 | News Report 26 |
| News Report 2 | News Report 27 |
| News Report 3 | News Report 28 |
| News Report 4 | News Report 29 |
| News Report 5 | News Report 30 |
| News Report 6 | News Report 31 |
| News Report 7 | News Report 32 |
| News Report 8 | News Report 33 |
| News Report 9 | News Report 34 |
| News Report 10 | News Report 35 |
| News Report 11 | News Report 36 |
| News Report 12 | News Report 37 |
| News Report 13 | News Report 38 |
| News Report 14 | News Report 39 |
| News Report 15 | News Report 40 |
| News Report 16 | News Report 41 |
| News Report 17 | News Report 42 |
| News Report 18 | News Report 43 |
| News Report 19 | News Report 44 |
| News Report 20 | News Report 45 |
| News Report 21 | News Report 46 |
| News Report 22 | News Report 47 |
| News Report 23 | News Report 48 |
| News Report 24 | News Report 49 |
| News Report 25 | News Report 50 |

FIG. 19

| Personnel Database, by Name |||||
|---|---|---|---|---|
| OVERTIME TRACKING: as of April 22, 2008 |||||
| Employee Name | ID # | Location | 1ST QTR '08 OT Hours | Current QTR OT Hours |
| Armstrong, John | 2468 | Zone A | 60 | 20 |
| Bittner, Bruce | 3355 | Zone J | 6 | 2 |
| Davis, Jena | 8750 | Zone B | 5 | 45 |
| Franks, Richard | 9930 | Zone A | 55 | 95 |
| Little, David | 3098 | Zone A | 45 | 20 |
| Masters, Craig | 5973 | Zone B | 8 | 50 |
| Pyotr, Peter | 3345 | Zone B | 12 | 10 |
| Samcyk, Dina | 4452 | Zone A | 15 | 35 |
| Utinger, Caryn | 5073 | Zone J | 8 | 0 |
| Zypick, Betty | 1507 | Zone J | 30 | 18 |

FIG. 20

| Personnel Database, by Zone |||||
|---|---|---|---|---|
| OVERTIME TRACKING: as of April 22, 2008 |||||
| Employee Name | ID # | Location | 1ST QTR '08 OT Hours | Current QTR OT Hours |
| Armstrong, John | 2468 | Zone A | 60 | 20 |
| Little, David | 3098 | Zone A | 45 | 20 |
| Samcyk, Dina | 4452 | Zone A | 15 | 35 |
| Franks, Richard | 9930 | Zone A | 55 | 95 |
| Davis, Jena | 8750 | Zone B | 5 | 45 |
| Masters, Craig | 5973 | Zone B | 8 | 50 |
| Pyotr, Peter | 3345 | Zone B | 12 | 10 |
| Bittner, Bruce | 3355 | Zone J | 6 | 2 |
| Utinger, Caryn | 5073 | Zone J | 8 | 0 |
| Zypick, Betty | 1507 | Zone J | 30 | 18 |

FIG. 21

METHODS AND PROGRAM PRODUCTS FOR COMMUNICATING FILE MODIFICATIONS DURING A COLLABORATION EVENT

CROSS REFERENCE AND RELATED APPLICATIONS

This application is a continuation in part of U.S. patent application Ser. No. 11/903,915 filed on Sep. 25, 2007 (now issued as U.S. Pat. No. 8,144,632), which claims priority to U.S. Provisional Application No. 60/847,061 filed on Sep. 25, 2006; is a continuation in part of U.S. application Ser. No. 11/477,069 filed Jun. 28, 2006; and is a continuation in part of U.S. application Ser. No. 11/477,169 filed Jun. 28, 2006 (now issued as U.S. Pat. No. 8,023,437).

This application is being filed with the U.S. Patent and Trademark Office contemporaneously with three other related applications, each of which also names as inventors Jon Swanson and Adam Chapweske. The three related applications are entitled: METHODS, SYSTEMS AND PROGRAM PRODUCTS FOR COMMUNICATING FILE MODIFICATION INFORMATION; DATA NETWORK COLLABORATION SYSTEMS HAVING A SHARED FILE; and METHODS FOR EFFICIENT COMMUNICATION OF SHARED FILE MODIFICATIONS DURING A COLLABORATION EVENT.

FIELD

The invention relates to updating an electronic file. Additional fields include methods and program products for communicating file modifications during a collaboration event such as a video conference.

BACKGROUND

Data communication over a data network (such as, for example, the Internet, Wide Area Network or Local Area Network) often requires the updating of a file. This may include updating a file between a client and server, for instance. One method for doing so is to communicate the entire file between computers every time it is updated. This approach can be cumbersome, however, if the file is large, if there are numerous users, if the updates occur frequently, if the files should be updated promptly, and under other circumstances. Extensive bandwidth and other network resources may be required. In this context, a file may be understood to include any type of similarly structured, electronic data records, including, by way of example, a database file, data stored in a markup language format (such as HTML or XML) files, raw data, a JPG image, a Word document, an MP3 file, a video file, and the like.

A large-scale collaboration event over a network, where multiple users are sharing and modifying a single file, may involve the updating and sharing of files. In such a case, the communication of the entire file upon the file being updated can prove an inefficient use of system resources. In a video-conference between many users, for example, many files may be resident on a server that are regularly updated and accessed by multiple different users. One or more servers may maintain files that list which users are present, for example, with the list changed every time a user enters or exits the event. Also, the multiple users may be collaborating on a file such as a word processor document, a drawing, or the like. Other files may be maintained by the server with technical information regarding the status of computer hardware and software being used by each user during the videoconference.

SUMMARY

One example method for communicating a file modification during a collaboration event includes steps of a first computer communicating a file modification status request to a second computer, the status request including at least a file identifier and a file property. The second computer uses the file identifier from the request to identify a current property of a corresponding file. The second computer compares the current file property to the file property from the status request and communicates a response to the first computer when the current property does not match the property from the status request.

BRIEF DESCRIPTION OF THE DRAWINGS

FIG. 19 is a representation of an additional file that may be used with example embodiments;

FIG. 20 is a representation of an additional file that may be used with example embodiments; and FIG. 21 is a representation of the file shown in FIG. 20, wherein the file has been reconfigured.

DETAILED DESCRIPTION OF EMBODIMENTS

Before discussing particular features of example embodiments in detail, it will be appreciated that the present invention may be embodied in a method, system, and/or computer program product. For example, a method according to one embodiment may be carried out by one or more users using computers or by one or more computers executing steps of the invention, and a program product of the system may include computer executable instructions that when executed by one or more computers cause one or more computers to carry out steps of a method of the invention. The program instructions of embodiments of the invention may be stored on one or more computer readable media (such as a memory), and may cause results of computations to be stored in one or more memories and/or to be displayed on displays.

Further, one or more computer(s) in combination with connected hardware such as one or more of cameras, microphones, monitors, projectors, and the like that are carrying out steps of a method of the invention and/or that are running a program product of the invention. It will therefore be understood that in describing a particular embodiment of the present invention, descriptions of other embodiments may also be made. For example, it will be understood that when describing a method of the invention, a system and/or a program product of the system may likewise be described, and vice-versa.

Figure 1:
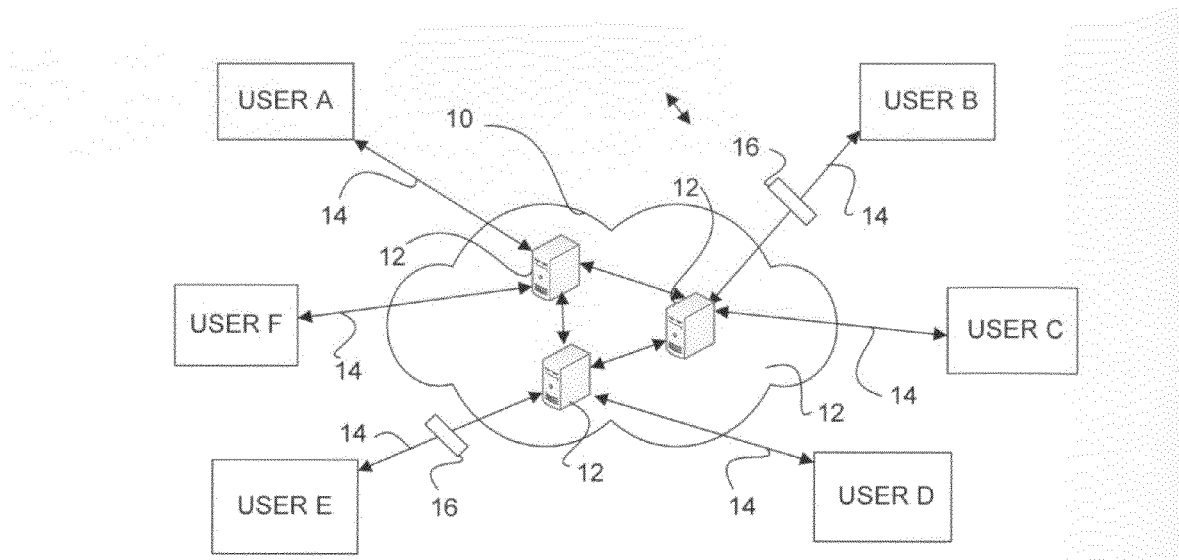
FIG. 1 is a schematic of a network useful to illustrate practice of some embodiments.

Turning now to the drawings, FIG. 1 is a schematic of a network 10 that is useful to describe example methods, program products and systems of the system. The network shown as a "cloud" 10 includes one or more computers 12 that link a User A (or, for example, Users A-F) to one another. The term computer as used herein is intended to be broadly interpreted as at least one electronic device that accepts, processes, stores, and outputs data according to programmed instructions. Thus, a computer can include, by way of example and not by way of limitation, a laptop computer, mainframe computer, cell phone, personal digital assistant, and processor-based controller on a machine. The computers 12 may also comprise one or more components for linking communications between users. It may include, for example, one or more processor based devices linked to one another for communications and each having a plurality of communication ports, a software component running on one or more memories that facilitate communications, a networking card(s), a modem(s), and the like.

The computer 12 can be referred to in the video/audio conferencing and networking arts as a "bridge" (or as containing a bridge) which can be, for example, a software component running on a server or router that controls one or more ports for interconnecting the Users A-F. As used herein the term port is intended to be broadly interpreted as a physical or logical destination and/or origination point for digital communications. Examples of ports include but are not limited to, network cards, an IP address, a TCP or UDP port number, and the like. A bridge may also comprise software useful to, for example, specifies one or more ports for communication between those users.

The network 10 may be a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. The network 10 may the Internet, a private network, a public network, a virtual private network, Local Area Network, Wide Area Network, or, of course, a successor to the current Internet (such as, for example, the "Fast Internet," or "Grid," currently under development by the European Centre for Nuclear Research (CERN) based in Geneva, Switzerland. The CERN "Fast Internet" is expected by some to transmit data orders of magnitude faster than what is currently understood to be broadband speed. The Fast Internet and each other successors to the Internet are referred to herein simply as fast versions of the Internet.

The protocol between the computer 12 and the Users A-F may be that of a server and client. The server client relationship between the computers 12 and the Users A-F may be reversed on occasion, wherein for some tasks the computer 12 is the client and the User A-F the server, and vice-versa for other tasks.

The network 10 may be useful for a number of data communication purposes. In an example application, the network 10 is useful to facilitate a real-time communications session, such as a video or audio conference, between one or more of the Users A-F. Examples of a video communications session include a videoconference wherein two or more of the Users A-F share streaming video and/or audio communications in real-time with one another.

As used herein the term "real-time" is intended to broadly refer to a condition of generally corresponding to actual time. For example, data can be real-time if it takes about one minute of data playback to describe an event that took about one minute to occur. Real-time data may be, but is not necessarily, "live" data that is generated and communicated substantially contemporaneously with minimal delay or such that the delay is not obtrusive with respect to a particular application. As an example, delay of less than several seconds, or less than 1.0 or 0.25 second, or another, similar time between an event and a communications of such event to another computer user may be considered live for the purposes of the present system.

In a videoconference, for example, multiple participants may be sending and receiving live real-time video and audio data to one another—each is talking to one or more of the others in real-time with delay at a suitably minimal level so that "conversations" between users over the network can take place in real-time. It will therefore be appreciated that the terms, "live" or "real-time" when used in this context is not limited to zero delay, but instead that some minimal delay is allowed for which may be for example of the order of several seconds. The delay should not be so great as to cause difficulties in different users communicating with one another—delays greater than about 5 seconds may be unsuitable in many applications.

In many videoconference or other real-time collaboration events, all of Users A-F may see and hear all others of Users A-F by simultaneously communicating streaming audio and video data streams to all others of the Users A-F. Communications between each of the Users A-F may be carried out on a two-way basis from the network 10, with data sent to and received from each of the Users A-F over the communications lines 14. These may comprise physically wired connections such as copper wires, optical fiber cables, or the like; or may be wireless connections. Real-time video, audio, and other data may be communicated from each of the Users A-F to all others of the Users A-F through the bridge 12 and over the communications lines 14. A firewall 16 or other security device may isolate the Users A-F from the network 10. The firewall 16 has been illustrated in FIG. 1 as located on the communications link 14. This has been done for illustration only—the firewall 16 may be at any desired location useful to monitor and control access of traffic between a User A-F and the network 10.

Those knowledgeable in the art will appreciate that communications over the network 10 between the Users A-F may be carried out in any of a number of generally known procedures. For example, known methods of one or more of uni-, multi-, or broad-cast may be used. Also, the data may be streaming. In a streaming video communications session application, each User A-F may have one or more cameras, telephones and/or microphones from each of which is streamed a continuous, real-time data on a particular multicast address and port number. As used herein the term continuous data stream is intended to broadly refer to a data stream sent in substantially continuous succession, although some degree of intermittency is contemplated.

For example, a packetized data stream in IP may be continuous and streaming even though there may be some delay between discrete packets.

Different protocol communications may be supported by the network 10 and the users A-F, including but not limited to ITU H.320, ITU H.323, ITU H.324, SIP (session initiation protocol), RTP (real time protocol), RTSP (real time streaming protocol), RTTP (real time transport protocol), HTTP (hyper text transfer protocol) and other suitable protocol for initiating and communicating real time and streaming data. It will be appreciated that when used in this context, the term "communicated" is intended to be broadly interpreted and does not require direct communication. For example, a first User A may communicate data to a second User B, even though the data passes through a number of intermediate nodes between origination and final destination.

Figure 2:
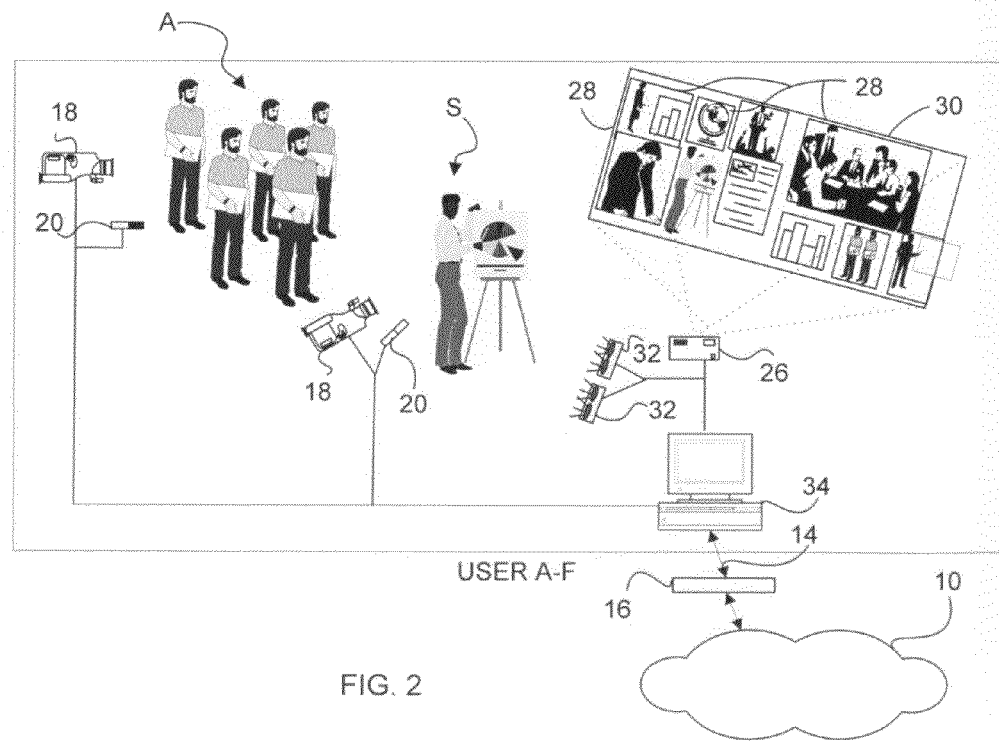
FIG. 2 is a schematic of one example video conference attendee room useful to illustrate practice of some embodiments.
Figure 3:
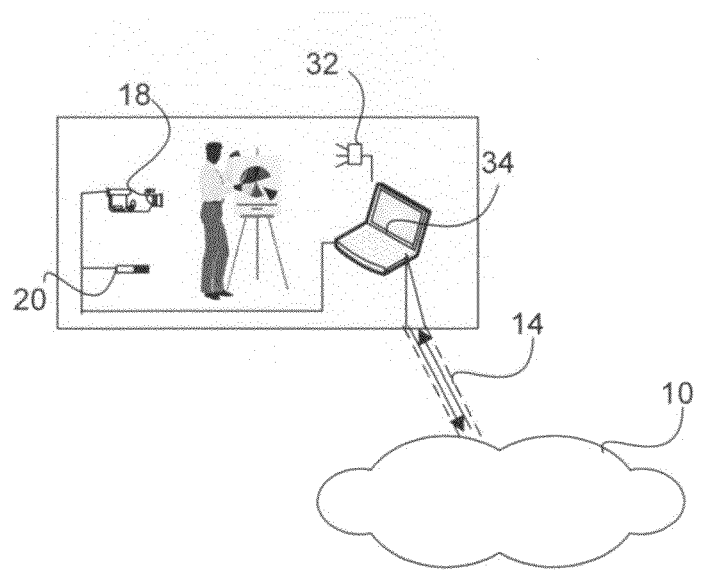
FIG. 3 is a schematic of a second example video conference attendee room useful to illustrate practice of some embodiments.

Communications of the streaming data between Users A-F may be further appreciated through consideration of FIGS. 2-3 that schematically show some representative configurations of the Users A-F. As shown by FIGS. 2-3, the Users A-F may be conference rooms, class rooms, or other spaces in which multiple individuals gather to participate in the video communications session with other individuals that are located at others of the Users A-F. FIG. 3 illustrates an alternate configuration in which a single individual is participating in the conference from, for example, a home office, a hotel room, or other location. Each of the Users A-F can use one or more cameras 18 that are directed at an audience A, an instructor S, or other things or people. In FIG. 3, only an audience A is present (which may be only one individual—or may be more).

Many different cameras will be appropriate for practice of example embodiments, with suitable examples including those available from LOGITECH Co., Fremont Calif. (e.g., Logitech QuickCam Pro 4000), the MICROSOFT LifeCam VX-1000, the SONY EVI D100 series and/or the CANON VC series of remote pan/tilt cameras, and the like. With reference to FIG. 2, the cameras 18 at one User A-F may be trained on different people or things at that location, with an example being one camera 18 at an audience A and one camera 18 at a speaker S. The cameras may be controllable remotely, so that User A may be able to direct the direction of a camera 18 at User B, for instance. At other locations, with examples shown in FIG. 3, only one camera 18 is present.

In FIG. 2, two microphones 20 are provided—one for receiving audio from the instructor S and a second for receiving audio from the audience A. There are a wide variety of suitable microphones available for practice of embodiments of the system, including by way of example SONY ECM microphones, PHOENIX Duet microphone, POLYCOM microphones, and the like. Although not illustrated, those knowledgeable in the art will appreciate that other cameras, microphones, computers, gateways, firewalls, mixers, multiplexers, and like devices may also be present depending on desired video communications session details and other factors.

With reference to FIG. 3, only a single camera 18 is provided and a single microphone 20 along with a laptop computer 34. This might be useful for allowing an individual to participate in a video communications session from a home office, while traveling in a hotel room or on a plane, or the like. The camera 18 (such as a LOGITECH QuickCam) and microphone 20 might be combined on a laptop mountable unit, for instance, and the speaker 32 (and an alternate microphone 20) might be headphones worn by the user. Suitable headphones include those available from PLANTRONICS Corp. This example configuration is particularly convenient for portable participation in video communications sessions.

In an example video communications session such as a videoconference, each of the Users A-F not only sends streaming video and audio data, but likewise receives streaming video, audio, and other data communicated from some or all of the other Users A-F. Referring once again to the schematics of FIG. 2-3 by way of example, one or more projectors 26 may be provided to project real-time video images 28 from one or more of the other Users A-F on a screen 30.

There are a variety of suitable projectors widely commercially available, with examples including those from INFOCUS Co. such as its LP series, TOSHIBA TDP series, NEC MT series, SHARP PG series, and IBM projectors. The projectors may have specification as are appropriate for a particular application, with an example being having at least 2000 lumens and XGA resolution. Also, it will be appreciated that use of a projector to display output images may easily be replaced with use of a monitor on which output video images are viewed. For example, FIG. 3 illustrates a laptop computer 34 the monitor of which may be useful to display output video data streams 28 from others of the Users A-F. Other larger size monitors may also be useful for display of video data, with examples including standard cathode ray tube monitors, 19", 40", 50" and larger plasma, LCD and other technology monitors. One or more speakers 32 may also be provided to play real-time audio from the other users or other sources.

Any number of video images may be provided that show video data in real-time from any number of other cameras or other sources located at the other users. For example, the user A may simultaneously display output video data streams 28 from each of the other users B-F, or may choose to display on a select subset of those streams. The display of streams may be set as desired, with different output display streams 28 located in different locations on the display 30. Further, the output video streams 28 may include charts, graphs, documents, other digital files, replayed video files, and the like.

Digital documents such as charts, word processor documents, spreadsheets and the like may be input to any of the computers 34 at any of the Users A-F for display at all or some of the other Users' locations. Likewise, digital images, including stored video streams and digital documents, for instance, may be stored in a memory accessible over the network 10 for replaying during the video communications session at any or all of the Users A-F. Output video streams 28 may be manipulated as desired, with examples of manipulation including moving the images, resizing the images, and the like.

A particular example of a data file in addition to audio and video data includes shared files (sometime referred to as documents) having text, images, numerical values, and the like. For example, within a videoconference or virtual meeting different of the Users A-F at different locations may desire to all work on a single document. In such circumstances, the single document may be described by a shared file stored on the network and which can be modified by any of the Users A-F. Each User A-F receives continuous updates of the document so they are aware in close to or at real-time of modifications and the current state of the document.

A variety of other shared files may be useful in conducting collaboration events within practice of the system. It may be useful, for example, for each of the Users A-F to know in or close to real-time which other Users are connected to the network 10 and available for conferencing. This can be accomplished through maintaining a shared user presence file on the network 10 that is regularly updated to reflect currently available Users A-F. Users A-F also receive regular updates of the shared user presence file to indicate current status of other Users. Other examples include shared files maintained on the network 10 that list the current status of hardware at each of the Users A-F (e.g., which of cameras 18 and microphones 20 are on, what their settings are, etc.), chat applications, and others.

The one or more computers 34 at each of the Users A-F may be used to receive and send all of the video, audio, documents, digital files and other data at the standard user A. The computer 34 may be referred to as a client computer or client, although as noted above it may also function at times as a server with the computer 12 being a client. A variety of computers that are currently commercially available will be suitable for use as computer 34, with examples including the Dell Precision 470 with dual processors and the HP Workstation XW6000 dual processor.

As with the computer 12, the computer 34 is intended to be broadly interpreted and is not limited to a single, desktop type computer as illustrated. Other devices that include a processor capable of executing instructions may be used, although they may sometimes be referred to as a device other than a "computer." Accordingly, the term "computer" as used herein with reference to computer 34 (and computer/server 12) is intended to be broadly interpreted. Examples include, but are not limited to, media communications devices having a processor, communications devices such as processor enabled phones or personal digital assistants, processor based gaming devices, and the like. Further, the computer 34 may be comprised of two or more computers linked to one another.

An application program, including one or more codecs, are running on the computer 34 to provide signal coding/decoding, compression/decompression, to coordinate receiving and sending of the data streams, and to control other aspects of sending and receiving of the data streams. For example, the computer 34 may be used to control which or how many video images 28 are displayed on the screen 30, to size the images 28, to set audio levels for the speakers 32, and the like. Each computer 34 may be running a video codec, an audio codec, other codecs, one or more application programs, and other programs. These may be combined into a single application program or may be separate from one another. The computer 34 may also have video and audio capture cards, with an example being WEBCAM Corp. 4 input video capture card.

According to the configurations of FIGS. 1-3, a communications session such as a videoconference or other virtual meeting can occur between two or more of the Users A-F. The Users A-F may virtually "attend" an immersive and extensive virtual meeting that includes audio, video and/or other streaming data shared in real-time. Participants at each of the Users A-F may simultaneously hear and/or view data from all others of the Users A-F. As discussed above, one or more Users A-F may collaboratively work on one or more shared documents held on the network 10 with each receiving regular updates of modifications made by others. Such meetings may be desirable for corporations, universities, government, and other groups of people located remotely from one another that find it useful to interact in an environment that allows a greater level of intimacy than an audio-only phone call or a single image video conference.

Applications for use of video communications sessions of the present system include, but are not limited to, distance learning, medical consultation, industry collaboration, social interaction, government or university collaborative research, entertainment, gaming, financial market trading, and the like. In a distance learning application, a professor at one site (e.g., User A) may be able to take questions from students located at many additional sites (e.g., Users B-F), which can be locally located (e.g., different rooms or buildings in same campus) or very far from one another (e.g., different cities, states or countries).

In some communications sessions of the system, each of the sites can view and hear all of the other sites. In a medical consultation application, doctor specialists from around the country can participate in the diagnosis of a particular case. X-rays can be viewed by all, and each doctor at each location can discuss the case with all of the other participating doctors. In an industrial collaboration application, remotely located engineering, marketing, management, and labor teams may all discuss development of a new product. Each site may ask questions of any other site, and each site may submit documents and charts covering aspects of the project for which they are responsible.

Having now described a typical network supporting a collaboration event such as a video conference that may find utility in practicing methods, systems, and program products of the system, more particular detail regarding some example embodiments can be provided. Some embodiments of the system may be broadly categorized as conditioned/conditional requests and notifications between clients and servers.

So-called conditional requests require that the request be responded to upon satisfaction of a request. For example, a client may issue a "GET" request on some status information on a conditional basis. Under such a circumstance, the client will receive the status information if some condition is satisfied. For example, a client may issue a conditional GET STATUS request on the condition that the STATUS information has changed since it was last retrieved. This can be thought of logically as being on the basis of an "if", and, in fact, can be accomplished in some protocols by using an "if" command in a header.

Once again referring to hypothetical computer code by way of illustrating an example, the command: "GET STATUS (007) IF MODIFIED SINCE(TIME1)" would result in data corresponding to the status of (007) being returned only if that data had been modified since (time1). A more detailed code example of a conditional GET request is:

GET
HTTP://IG.ACME.COM/USERS/ACHAPWESKE/STA-
　　TUS.XML HTTP/1.1 IF-MODIFIED-SINCE: SAT, 29
　　OCT 1994 19:43:31 GMT

If STATUS.XML has been modified since the specified date/time (SAT, 29 OCT 1994 19:43:31 GMT), the response would be:

HTTP/1.1 200 OK
CONTENT-LENGTH: 41
<ONLINEOROFFLINE>ONLINE</ONLINEOROF-
FLINE>

If, on the other hand, that resource has NOT been modified since the specified date/time, the response would be:

HTTP/1.1 304 NOT MODIFIED

Embodiments of the present system, however, introduce a previously unknown step of performing a "conditioned" request. A conditioned request, as used in the present disclosure, may be broadly thought of as a logical "when" as opposed to an "if." That is, a conditioned request asks for information not on satisfaction of an "if" condition, but instead upon satisfaction of a "when" condition. Again referring to hypothetical computer code by way of illustrating an example, the conditioned command. "GET STATUS(007) WHEN MODIFIED" would result data corresponding to the status of (007) being returned only when that data is modified. The above example detailed code example of a conditional request can be altered through a step of a system embodiment to be re-expressed as a conditioned request as follows:
  GET
    HTTP://IG.ACME.COM/USERS/ACHAPWESKE/STATUS.XML HTTP/1.1 WHEN-MODIFIED
In this case, when (not "if") STATUS.XML is modified the response would be:
  HTTP/1.1 200 OK
  CONTENT-LENGTH: 41
    <ONLINEOROFFLINE>ONLINE</ONLINEOROFFLINE>

As illustrated through these examples, steps of a conditioned request have advantages over a conditional request in some applications with one example being communicated only once to "wait" for a change, as opposed to being continuously and repeatedly communicated to "look" for a change.

Conditioned requests have been discovered to have significant benefit and utility in some real-time communications session embodiments of the present system, with a particular example being a multi-user video conference. When practicing a method of the system using traditional client-server architecture, clients generally cannot communicate directly with one another to obtain certain information. Although direct communication can potentially be made between clients, such communications can be complicated. Typical client-server architecture relies on clients requesting that actions be performed by a server, and one client requesting information directly from another client(s) (i.e., requesting another client to take an action) conflicts with this general architecture. Instead, in typical client-server architecture applications, clients generally rely on indirect communication with other clients through a server. A first client requests the server to report some information about a second client, such as status. This can complicate and slow notifications, however.

For example, one user may desire to know when a second user joins or leaves a data communications session such as a videoconference. This can be difficult when operating within traditional client-server architecture. In such circumstances, a first client might be required to continually send a request to a server, with an example being: "GET STATUS(USER2)." Some efficiency might be achieved by using a conditional request: "GET STATUS(USER2) IF CHANGED SINCE (TIME1)" to reduce the reported STATUS data (which in one video conference application can be thought of as availability status—is User2 available to participate in a video conference?). Under either alternative, however, requests have to be continually sent to monitor the status of user2. This situation of repeated or even continuous polling consumes bandwidth and requires frequent actions on the part of the client and server (or source and sink).

Some methods, systems and program products of the system, however, provide improvement through conditioned requests in a client-server architecture. For example, a conditioned request may be used to request a notification in a real-time communications session. The above illustrated commands of the prior art, for instance, can be replaced with the conditioned request: "GET STATUS(USER2) WHEN CHANGED." A conditioned request of the system need only be sent once, and a responsive report of status of user2 will only be made when (i.e., not "if") that status changes. A conditioned request may include one or more parameters that define the "condition" to be satisfied before the method is executed, with an example being the condition that STATUS (USER2) (e.g., availability status) must change before the GET method is executed in the above example conditioned request.

Particular examples of conditioned requests that may be practiced in embodiments include conditioned notifications, status requests and the like. One particular example of a conditioned request in a method, system and program product of the system is a conditioned status request communicated by one user to a sink concerning a second user. Referring to FIG. 1 by way of illustration, User A may communicate a request including the conditioned availability status request to "GET STATUS (USER_B) WHEN CHANGED" to a server on the network 10. The request is responded to by the server with the result that the status of "USER_B" is communicated back to the client (User A) when that status changes.

Conditioned requests are applicable to other requests in addition to GET requests illustrated above. Also, conditioned requests may be based on conditions other than a time parameter as was illustrated in the above examples. One example is comparison of an identifier that indicates the version of a file. For example, a "does not equal," "when-none-match" or similar logical operator can be used in a conditioned request with a header parameter. The result of use of such an operator is to compare the values specified. When the compared values don't match the condition is satisfied.

One such conditioned request example useful in embodiments compares version numbers of files (or resources) between the most recent known to a client (or a source) and the most recent known to or available from a server (or a sink). If the version numbers don't match, a modified version is available. For example, a GET response can return a "tag" header from a file that specifies an ID that uniquely identifies the current version of that file (e.g., "Tag: ABCXYZ123"). When the file is modified, its tag changes. A GET response can also include the tag(s) of the version(s) of the file currently known to the client (e.g., GET Tag(Recorder_3) when TAG Does_Not_Equal:ABCXYZ123). When the tag of the file at the server differs from those currently known (e.g., "when-none-match" or "not-equal-to"), a response is issued.

This operates similar to the above illustrated "When-Modified-Since" operator, except an opaque identifier condition is relied on instead of a time value. This can be advantageous in some situations, with one example being when a file is modified within one second of an issued response—if the timestamp's resolution is 1 second, there is an opportunity to miss a modification or get an extraneous copy if relying on a "when-modified-since" condition.

Particular example embodiments of the system may be further illustrated through consideration of the following examples. One embodiment of the system has been discovered to be particularly useful for maintaining a shared file on a network in a collaboration application where updates are frequently communicated to multiple users as the shared file is updated by other users. An embodiment of the system may be described as a highly efficient method for communicating only the modifications of an updated shared file to users, and only communicating that modification when the shared file changes. Such embodiments achieve important advantages and benefits over the prior art, including reduced resource consumption, increased stability, and others.

Figure 4:
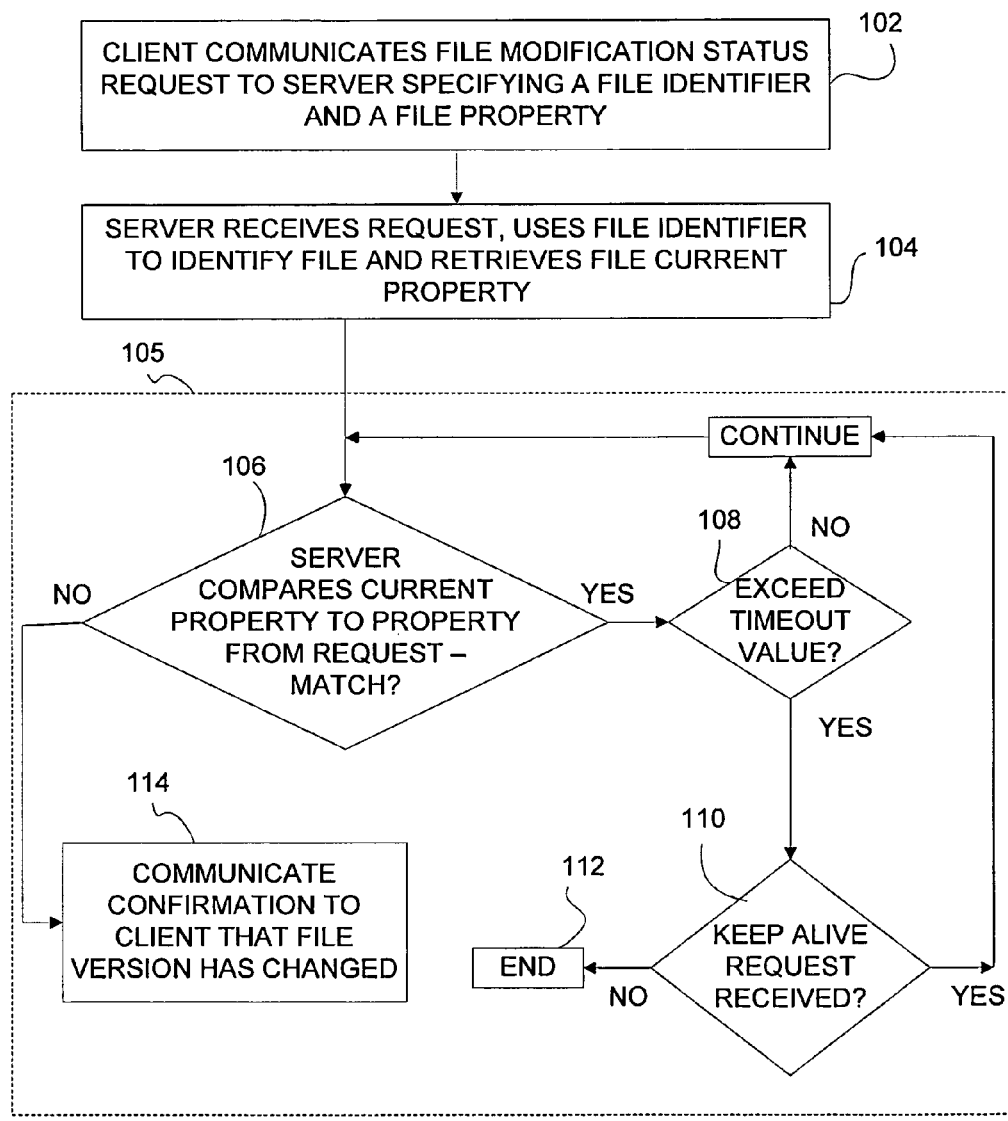
FIG. 4 is a flowchart useful to illustrate some example embodiments.

FIG. 4 is a flowchart useful to illustrate some example methods, systems and program products of the system. A client (which may be one or more of the Users A-F, FIGS. 1-3)

communicates a file modification status request ("FMSR") to a server (such as server 12, FIG. 1). Block 102. The FMSR can be in any desired format, and can take any of many suitable forms. It may be a single, discrete communication, or may be embodied in several discrete communications. In the example embodiment of FIG. 4, the FMSR includes at least a file identifier useful to identify a particular file and a file property.

The file may be any number of suitable files, with examples including XML documents located anywhere on a network (such as network 10, FIGS. 1-3). Some example files are files that are collaboratively shared between two or more clients whereby each of the clients is required to be regularly updated of modifications made to the file by others of the users. Some example files include information such as collaboration user status, hardware settings of other users or devices, collaborative input from users, and the like. Files are not limited to data that is (or can be) stored on a memory medium, but instead also include data that is not stored on any memory medium.

The file identifier can be any information useful to identify the file. It can be a file name and may also include information for locating the file. It can be, for example, a URL that specifies the file and a network accessible location or can be XML formatted data that likewise includes information describing where the file may be found. Because the file is regularly updated, it includes a version number that changes with updates.

The file property can be any of a variety of properties for the file that change when the file is modified. The property can be, for example, a version number, a file size, or others. One particular property that has been discovered to be useful in many invention embodiments is a file version number or identifier that can be used to identify a particular version of the file, with alphanumeric characters being one example. It will be appreciated that a version (or file) "number" is not limited to being numerical, but instead may be any suitable data to identify a particular file and/or version of that file. When operating using HTTP, a file version identifier can be the entity tag (or ETag) value. Also, the file version number need not necessarily be included in or with the shared file. It may be, instead, separately maintained but associated with the shared file. It can also be, for example, a time or sequence stamp, and may be contained in a header of the shared file.

Also, it will be appreciated that although the file identifier and version identifier/version number may be discussed and illustrated herein as individual datum and as being discrete from one another, in some embodiments they may be contained within a single data element. A single alphanumeric string, for example, can include both the file identifier and the version number.

After receiving the FMSR, the server uses the file identifier contained therein to locate the file and retrieves its current property. Block 104. The server then proceeds to a series of steps contained in dashed line box 105. These steps may be thought of as processing a conditioned request. First, the server compares the current property from to the property from the FMSR. Block 106. If they match, then no modifications to the shared file have occurred since the version specified in the FMSR. That is, the file version communicated from the client is the same as the most current file on the network 10, and there are therefore no modifications to the shared file to notify the client of.

The method of FIG. 4 will then loop back to continually check the file current property until a mis-match is determined. In some embodiments, this loop will continue indefinitely until a mis-match of properties is discovered (i.e., until the shared file has been modified and its property changes). This might occur, for example, if the file property is a version number which has been changed upon modification of the file.

In the method of FIG. 4, however, the server determines whether a time-out value has been exceeded. Block 108. Time-out values are useful in some applications to avoid unforeseen errors, network instability, and other unwanted results that may occur when a looping process is otherwise allowed to run endlessly until a condition is satisfied. The time-out value may be set as desired depending on particular application parameters. In many example videoconference and real-time collaboration applications, values of between about 2-3 minutes have been found to provide unexpected results and benefits. The number of cycles through the looping logic will vary with application, timeout value and other design parameters, with 30 or more cycles being an example value.

The embodiment of FIG. 4 also includes a determination by the server of whether a "keep alive" request has been received from the client. Block 110. Should the client not receive a response from the server (i.e., the comparison of file version identifiers did not yet result in a mismatch), and should the client wish for the server to continue to check for file modification, it can communicate keep-alive requests to the server to "override" a timeout condition. Clients may continually communicate keep alive requests at some reasonable set interval, or may do so on an interval that is set to be just less than the time out value. Intervals of between about 10-20 seconds have been discovered to provide unexpected results and benefits in large scale video conferences and collaboration events. If the time out value has been exceeded and no keep alive requests have been received, the embodiment of FIG. 4 terminates. Block 112. Otherwise, the embodiment of FIG. 4 loops back to continue to compare file version identifiers.

It will be appreciated that the time-out and keep-alive request steps discussed above and illustrated by blocks 108-112 of FIG. 4 are optional steps that have been discovered to provide benefits and advantages in some embodiments. Other embodiments may not include these steps. Further, some embodiments may include steps of using a timeout value only but not a keep-alive request step.

When the current file version identifier does not match the version identifier from the FMSR at block 106, a "no" decision results. This indicates that some modification has been made to the file to change it from the state it was in when it had the version identified contained in the FMSR, and that the client is therefore not aware of these modifications. A confirmation is then communicated to the client. Block 114.

In considering the embodiment of FIG. 4, it will be appreciated that through the steps of looping contained within dashed line box 105, this embodiment effectively operates using a conditional "when" logic as opposed to "if" logic. That is, the looping steps cause the embodiment to communicate a confirmation "when" the condition is satisfied ("when" a modification is detected)—not "if" the condition is satisfied.

Practice of embodiments of the system utilizing these steps have been discovered to provide important, unexpected and unpredictable advantages and benefits over the prior art. For example, client server communications often occur using streaming or other synchronous protocols, with examples including HTTP and RTSP. In such protocols, client server communications are immediate—a client communicates a request to a server and the server responds. Achieving a file status change notification under such protocols has in some past systems required constant and repeated polling of the server by the client. This requires significant bandwidth for communications between the client and server as well as significant computational resources at both the client and server ends to process the constantly polled requests and responses.

Practice of embodiments of the system (with an example being that of FIG. 4) offer great advantage and benefits over these methods, systems and program products of the prior art. For example, in embodiments such as that illustrated by FIG. 4 only a single request need be sent from the client to the server. No repeated or constant polling is required. The server, even if communicating with the client in a synchronous format (such as HTTP, RTSP or other streaming protocol) through practice of the system processes that single request in a manner that may be considered to effectively be non-streaming or asynchronous. Modification requests are communicated to the client only "when" necessary.

This represents a significant achievement of corresponding embodiments. Prior to the present system, systems and methods have struggled to efficiently achieve communication of updates of shared files in group collaboration applications because of this synchronous architecture. Embodiments of the present system, with FIG. 4 being one example, provide an elegant solution to these otherwise unresolved needs. Significant and unexpected benefits are achieved, including reduction of communications overhead, network latency, and consumption of network resources.

As discussed above, although consideration of a shared file version number is useful to determine when a modification has been made, other examples of the invention use other properties of the shared file. Any number of properties of a shared file may be reviewed to indicate whether a modification has occurred. Some examples include the size of the shared file (presumably it becomes larger when data is added and becomes smaller when data is deleted), shared file location (the shared file could be stored in a new location upon modification), shared file date stamp, a logic modification flag that changes every time the file is opened, and the like. Any of these or similar properties can be used in different embodiments of the invention.

For example, in another example embodiment, the client communicates with the FMSR a shared file size to the server in block 102 instead of a shared file version number. In this example embodiment, the server compares the shared file current size to the size provided in the request to determine if the shared file has been modified. Block 106.

Referring again to block 114 of FIG. 4, in some embodiments the confirmation communicated from the server to the client is simply a confirmation that modification has occurred. In other embodiments, however, other information is included in the confirmation. For example, a summary of the modifications to the file may be communicated to the client. It has been discovered that significant advantages to bandwidth and other network resource consumption issues are achieved by communicating only the modifications to the file, and not the entire file. Put another way, some embodiments inform the clients of only what has changed in the updated file to reduce the amount of data required to be communicated and processed. This has been discovered to provide significant advantages and benefits, particularly when frequent updates are provided, when the modified data is small in comparison to the overall file size, and in other circumstances.

In some embodiments, further benefits and advantages are achieved by configuring the confirmation in the form of a markup language document, with one example being an XML document. Additions to the file since the previous version (that identified by the version identifier in the FMSR) are placed in one defined field of the XML document, and deletions made to the current version as compared to the previous version are placed in a second defined field of the XML document. The document may contain, for example, "add" and "delete" root portions.

Still further significant advantages and benefits over the prior art are achieved through such steps, particularly when the shared file is in a markup language format such as XML as is the corresponding file copy maintained by the client. Those knowledgeable in the art will appreciate the ubiquitous use of markup language data in modern network applications. Markup languages such as XML provide good levels of functionality related to encoding properties of data. In addition to simply providing a data value (e.g., "x=6"), markup languages such as XML allow for useful information about the data value to be conveniently coded (e.g., "x=6 and should always be less than Y, should be a multiple of Z, cannot be modified by User C, and is located on the third page, fifth line of the spreadsheet").

Embodiments of the present system exploit the functionality and flexibility of markup languages by extending their use to include the FMSR, the shared file on the network 10 (FIG. 1), the confirmation, and the file maintained by the client computer. In this manner, markup language formatted data maintains its form throughout the journey from client (User A-F), to server 12, and back to the client. This results in an essentially single shared document being distributed across the client (User A-F), the server 12, and all points between. No conversion of data is required, as is often required with prior art systems and methods. This reduces required resources, eliminates an opportunity for conversion error to be introduced, increases stability of the process, increase system stability, and increases the speed of execution.

As described above, advantages are achieved by communicating modifications to the shared file to the client only as opposed to the entire file (as well as communicating these modifications only "when" they occur through the logic of dashed line box 105). Further advantages can be achieved in some embodiments by organizing the modifications into "additions" and "removals" to the shared file.

Figure 5:
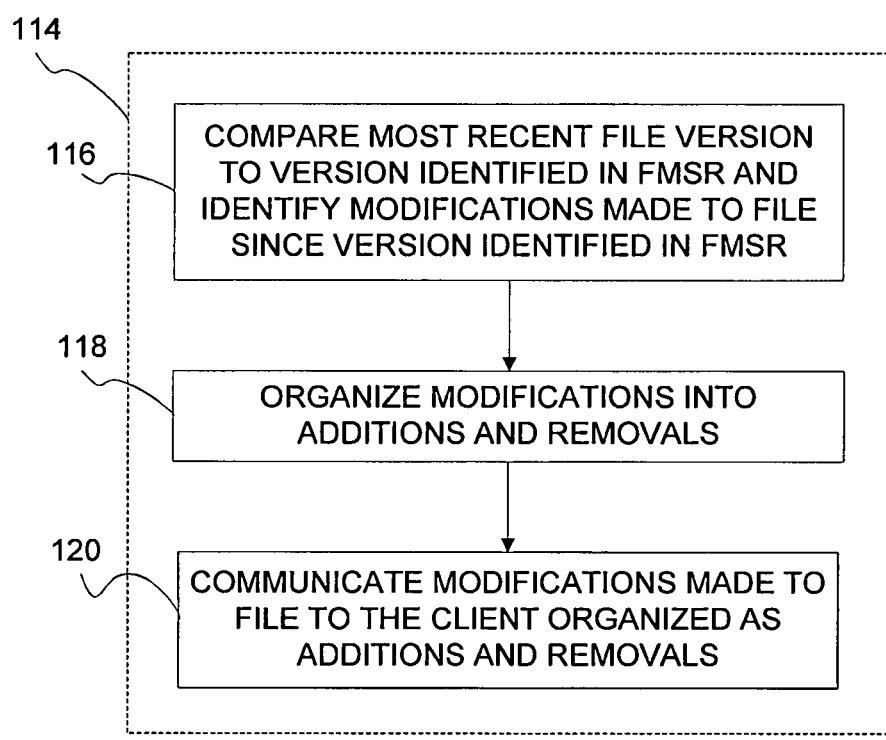
FIG. 5 is a flowchart illustrating one example set of alternate steps for a portion of the flowchart of FIG. 4.

FIG. 5 illustrates one set of example steps that are one possible subset of step 114 for communicating only the modifications and for organizing these modifications into additions and removals. A comparison of the most current version of the file is made to the version identified by the FMSR (i.e., the most recent version that the client is aware of) and any differences between the two versions are identified as modifications made to the file between those two versions. Block 116. These two versions need not be sequentially adjacent— in some circumstances there may be one or more file versions between the most current version and the version specified by the FMSR.

The identified modifications are then organized into additions and removals. Block 118. Additions comprise elements added to the file between versions and removals elements removed from the file. Other organization of the changes can be made. The modifications in the form of additions and removals are then communicated to the client in the confirmation (together with the most current file version number). Block 120.

Similar advantages and benefits may be achieved by configuring the FMSR in this manner. Although in some embodiments the FMSR may only identify a file and a version of that file, in other embodiments further information is provided. In some embodiments, for example, the FMSR may include information regarding the modifications that the client wishes to make to the file (one such example is discussed below). The FMSR may be configured in a markup language and can include distinct portions for additions and removals that the client wishes to make to the file.

Although FIG. 4 illustrates exchanges made between a single client and server, it will be appreciated that this and many other embodiments can be practiced in multiple user applications with that of FIG. 1 being an example. Referring now to that FIG. by way of example, each of the users A-E may have outstanding FMSR's pending with one or more of the servers 12. User F may modify a shared file that is subject to the pending FMSR. When the version number of that shared file is updated, the version number specified in the pending FMSR of each of users A-E no longer matches the current version, and a confirmation is sent to each of the clients A-E of the modifications made. In this manner, each of the users A-E (as well as user F) may be practicing an system embodiment as illustrated in FIG. 4.

It will also be understood that although FIG. 1 illustrates five Users A-F, embodiments of the system may find great utility when practiced during video conferences or other collaboration events with larger numbers of users. Indeed, those knowledgeable in the art will appreciate that another advantage of embodiments of the present system is that they scale well, and that the methods, systems, and program products illustrated herein are not limited to any particular number of users. Video conferences, for example, may be conducted with 10, dozens, or even hundreds or more participants using methods, systems and program products of the system.

Further illustration of various aspects of embodiments may be appreciated through consideration of a detailed example of another particular embodiment. Although different embodiments of the system will prove valuable when practiced in any of a number of different applications that include a shared file on a network which users are updated of when modified, many example embodiments are particularly well suited for practice during real-time collaboration events including video conferences generally configured as shown in FIGS. 1-3 and as described in corresponding discussion above.

In such a video conference, the Users A-F may be collaboratively sharing a document on the network 10. The shared file may be, for example, a spreadsheet, a drawing, a word processor document, a video file, or any other data containing file. The shared file may be formatted as HTML, XML, JPEG, a WORD document, an EXCEL spreadsheet, an MP3, or any other suitable format. Practice of methods, systems and program products of the system can achieve great advantage in these circumstances. For example, through practice of an system embodiment multiple users can modify the shared file, with other users notified of the modifications only when those modifications occur and receiving the modified material only (as opposed to the entire file).

Figure 6:
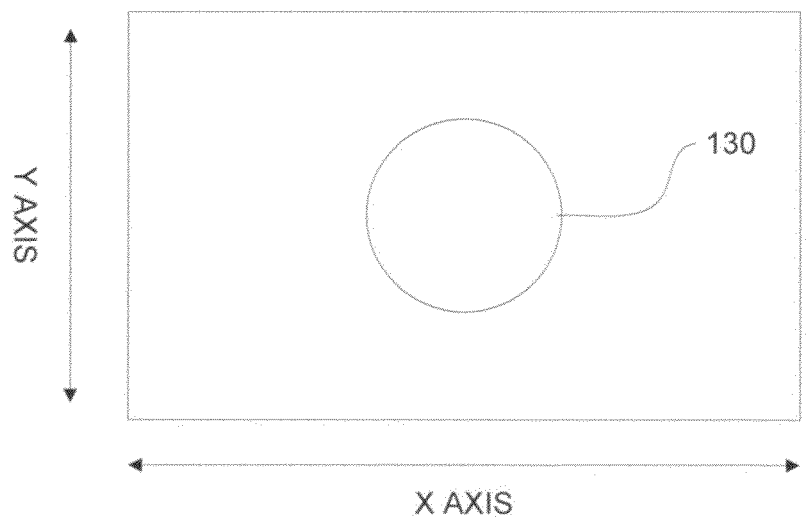
FIG. 6 is an illustration of a drawing board screen useful to illustrate an example embodiment.

One such example application is the use of a shared drawing board application wherein different users can collaboratively create and modify a drawing. FIG. 6 illustrates a simple example. A circle 130 has its location specified by x and y variables (for its center point), and its diameter by a "size" variable. Assume that initially the client has the variables set at x=3, y=5, and size equal to "medium." These variables can be manipulated by any user collaboratively working on the drawing through a user interface operating on the client computer (e.g., User A-F, FIG. 1). The variables describing the drawing object are stored in a shared file such as an XML document on or accessible through the network 10 (FIG. 1) called circle.xml located at: http://www.iocom.com/home/circle.xml.

Assume that all of the Users A-F (FIG. 1) desire to collaboratively work on this shared circle.xml file. The flowchart of FIG. 7 and schematic of FIG. 8 are useful to illustrate an example embodiment of the system useful to accomplish this collaboration. When any of the Users A-F (FIG. 1) initially join the collaboration event, they obtain a copy of the shared circle.xml file as it currently exists on the network 10. For the present example, assume that the initial version of the shared circle.xml file has a version number of "C," and that as the collaboration event attendees (Users A-F, FIG. 1) initially join the collaboration session they copy this file to their local computers 34 (FIG. 2). Alternatively, the users may have an existing stored copy of the shared file version C.

Referring once again to FIG. 7, assume further that one of the Users A-F desires to modify the drawing. Block 150. For example, the user may desire to shift the circle's position along the x axis and to make the circle smaller. Through use of a user interface operating at a client computer 34 (FIG. 2) and its data entry device (such as a mouse or keyboard), the user can click and drag the circle as desired to cause it to change position and size on the graphical user interface appearing on-screen and in the locally stored file. In the current example, assume that these movements cause the x value for the circle to be changed from 3 to 5 (representing a shift along the x axis of 2 units) and its size value to change from "medium" to "small."

The client computer then identifies only the modifications made to the locally stored file. Block 152. In the current example, the modifications include only the "x" and "size" values. These have changed, but the "y" value remains unchanged. The user then communicates a FMSR to the server 12. Block 154. The FMSR includes the file identifier (http://www.iocom.com/home/circle.xml), a version number corresponding to the most recent version of the file that the client has ("C"), and modifications that the client wishes to make to the file. In this example the file identifier includes not only a file name, but also information on the location of the file—where it may be found on the network 10. This is accomplished by using a URL.

Figure 7:
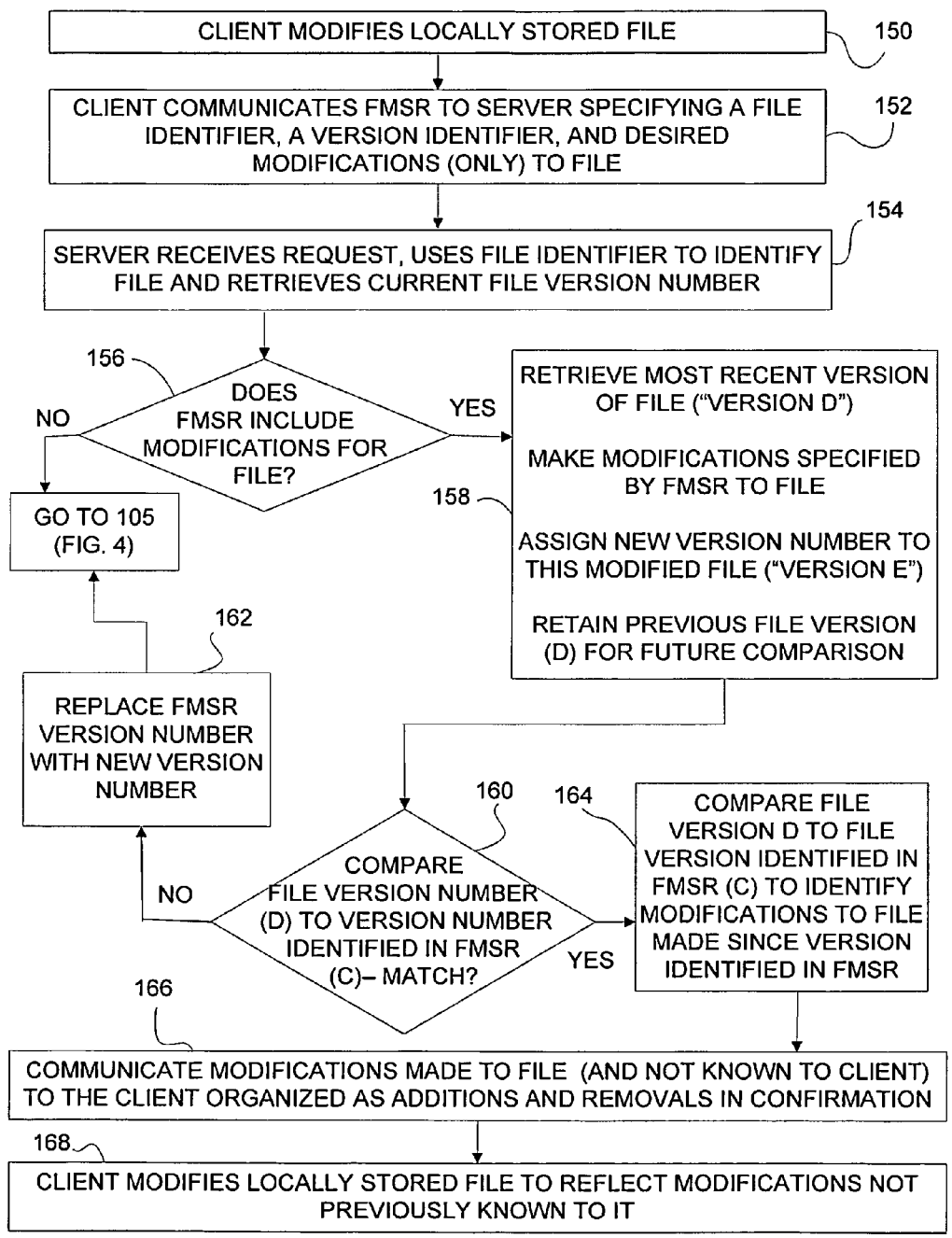
FIG. 7 is a flowchart useful to illustrate example embodiments.
Figure 8:
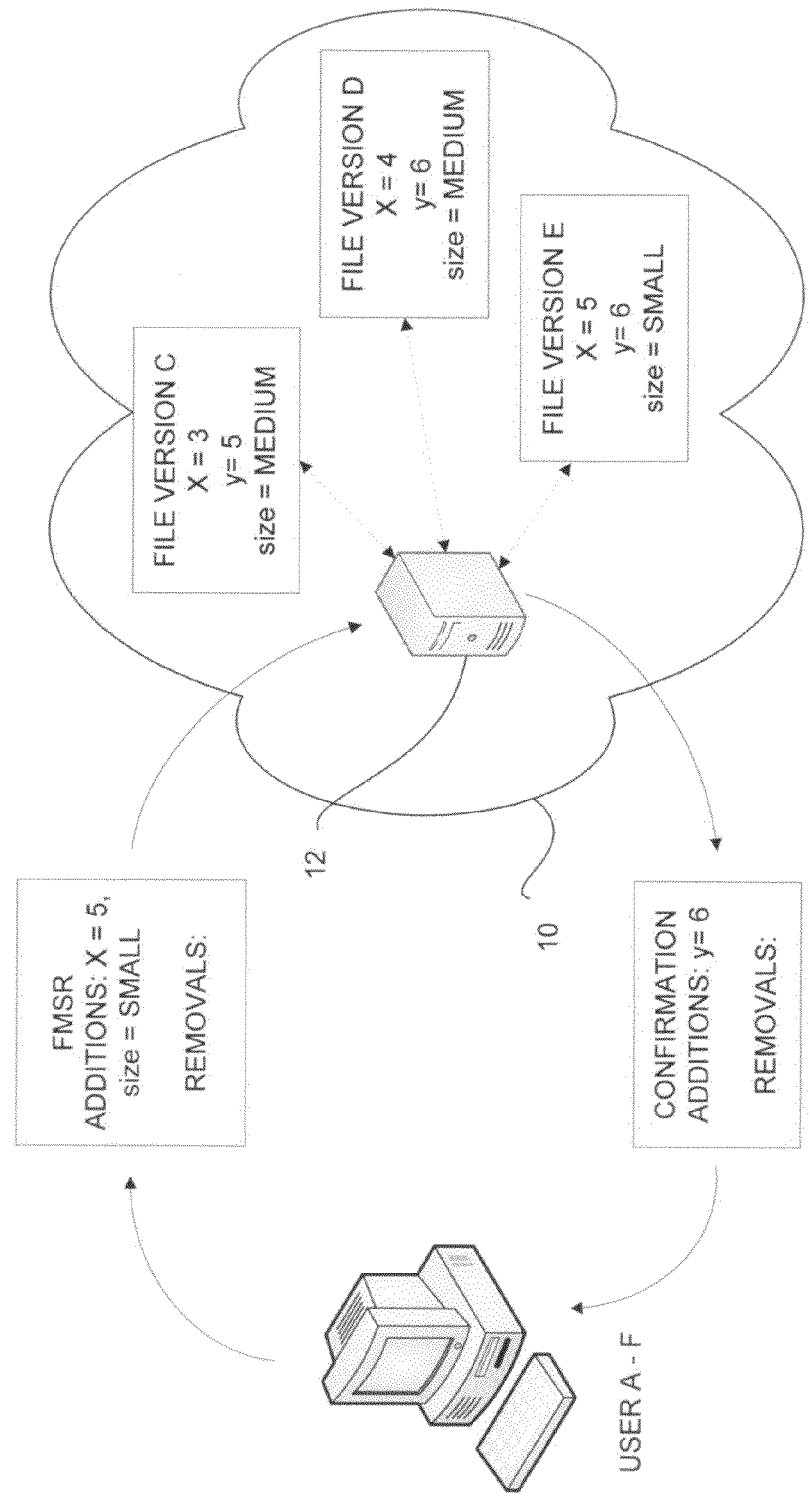
FIG. 8 is a schematic of a network useful to illustrate example embodiments.

In the example embodiment of FIGS. 7-8, only the modifications that the client (User A-F) desires to make to the file are communicated in the FMSR. This provides savings on bandwidth and other network resources by avoiding sending the entire file from the client. Additionally, the modifications are organized into additions and removals for placement into the FMSR. The example FMSR accordingly is generally includes information as follows:

| FMSR | |
|---|---|
| Variable: | |
| ID | http://www.iocom.com/home/circle.xml |
| Version | C |
| Addition | X = 5, size = small |
| Removal | |

As discussed above, it has been discovered that benefits and advantages are achieved by configuring the FMSR as a markup language document. XML is one example. These formats allow for additional functionality and properties of data to be conveniently communicated, and also provide for relatively seamless, conversion free transfer between a markup language shared file.

When the server receives this FMSR, it uses the file identifier (http://www.iocom.com/home/circle.xml) to identify the most current version of the file. Block 154. This step may include retrieving the file, or may include referencing a lookup table or other memory where the most current version number of this file is stored. The file may be located on a memory within the server 12, remote from the server 12 on another computer or storage device within the network 10, located on another network (such as the interne) accessible from the network 10, or may be otherwise maintained. The current version number of the file may be stored in the file, may be in the header portion of the file, may be located in another location in memory but associated with the file (such as in a lookup table), or may otherwise be maintained.

In the system embodiment of FIG. 7, the server next determines if the FMSR includes modifications to be made to the file. Block 156. If there are no modifications to be made, the server proceeds to dashed line box 105 of FIG. 4. Referring now to that FIG. 4, the server 12 will perform a series of looped steps as described above with respect to FIG. 4, blocks 106-114. Through these steps, the server 12 will continue to check the file until a mis-match is identified between the most current file version number and the version number from the FMSR. When such as mis-match is identified the server will send a confirmation to the client of a modification, together with information describing the modification. In this manner, the server will only report modifications to the client "when" they occur, without the requirement of the client sending repeated requests for information on an update.

Referring again to FIG. 7, because the FMSR in the present drawing board example includes modifications to be made to the file, a YES response results at block 156. The server 12 proceeds to perform a number of operations as summarized in block 158 of FIG. 7 (with no sequence intended by the order of presentation within block 158). In some embodiments, these steps may be carried out substantially simultaneously, or within a single process. Other embodiments may include staggering execution of these steps. In some applications, performance simultaneously or in a single process has been discovered to reduce the likelihood of interference or error resulting from receipt of an FMSR from another client while this step(s) is being performed.

The operations of block 158 include retrieving the most current version of the file. With reference now made to the schematic of FIG. 8 in addition to that of FIG. 7, assume that the most current version of the file when the FMSR is received is version D (indicating that the file has been updated since the client last received an update). Referring again to FIG. 7, block 158, the server modifies the most current version of the file (version D) to reflect the modifications desired by the client and described in the additions and removals of the FMSR and assigns a new version number (version E) to this modified file. The current file (version D) is retained for future comparisons. Block 158. This is useful, for example, if a future FMSR includes version number D and it is necessary to determine what has changed between some subsequent version (such as version E) and D.

In some embodiments, the version number for the newly modified file (version E) may be assigned at a different step of the method than as illustrated in FIG. 7. For example, in some embodiments it may be most efficient to assign the new version number as a header stamp when the corresponding new file or modifications thereto are communicated.

The server 12 also compares the version number of the current file when the FMSR was received (version D) to the version number identified in the FMSR (version C). Block 160. If the version numbers match, a "no" results from block 160 indicating that the client is aware of the most recent version of the shared file and it is not necessary to notify the client of any modifications. The embodiment of FIG. 7 proceeds to the block 162 where the version number from the FMSR (C) is replaced with the new most current version number (E), and then proceeds to the dashed line box 105 of FIG. 4. Replacing the version number is useful since the client is already aware of the contents of version E.

As described above with reference to the steps contained in dashed line box 105, the server will then continually compare the most recent version that the client is aware of (version E) to the most current version of the shared file on the network, and will notify the client of modifications when they occur. Although not illustrated in FIG. 7, some embodiments may also communicate to the client the new version number (E) and/or confirm that its desired modifications to the shared file have been made.

If a "yes" decision results from block 160, this indicates that the current version of the shared file includes modifications that the client is not aware of. The embodiment then compares the version identified in the FMSR to the most current version at the time the FMSR was received (version D) to identify differences between the two files. Block 164. The differences between the two files are organized into additions and removals for communication to the client in the confirmation. Block 166.

Some example embodiments of the invention store previous versions of the shared file in a network accessible memory so that they can be compared to the current version to identify differences between them. It may be useful, for example to store the previous 100 versions, or the previous 5 versions, or some other number of previous versions. The corresponding version number for each stored version is also retained. Thus, for example, modifications made since a sequential version 12 can be determined even if the current version number is a sequential 23 by comparing a stored version 12 to current version 23 (even though 11 sequential versions have come between).

These steps may be further illustrated through consideration of the schematic of FIG. 8. The new file version E includes the values of version D as modified by the additions and removals of the FMSR. The modifications between files D and C that will be communicated to the client include differences between those files, and do not include new values from file E that were arrived at through the adoption of modifications specified by the client and contained in the FMSR (e.g., no modification to x value is communicated since the FMSR modified x). Accordingly, the confirmation includes the following information:

| Confirmation | |
|---|---|
| Variable: | |
| ID | http://www.iocom.com/home/circle.xml |
| Version | E |
| Addition | Y = 6 |
| Removal | |

Once the client computer receives this, it will modify its locally stored version of the file so that it reflects the most current version stored on the network (i.e., is consistent with version E).

It will be appreciated that the FMSR and confirmations may take any of many different suitable forms, and that those illustrated herein above are examples only. As discussed, it has been discovered that including only modification data in one or both of the FMSR and the confirmation offers advantages and benefits over the prior art. It has additionally been discovered that configuring these files as markup text documents, with an example being XML documents, provides unexpected benefits and advantages in computer and network resource consumption.

Still further, segmenting the modification data into additions and removals has been discovered to provide benefits and advantages not previously achieved in many applications. This is an optional step of some embodiments, however, which may not be performed in some embodiments. Other categories can also be defined. Which data to define as "additions" and "removals" within the FMSR and the confirmation can depend to an extent on programming semantics. By way of example, in the present drawing board example the FMSR included a new x value in the addition portion. The previous x value could have been included in the removal portion to indicate that the previous x value should be "removed" and the new x value "added."

Alternatively, only an addition can be made (as was illustrated above) with the implication that a new x value inherently requires that the old x value will be changed (removed). With reference to the drawing board circle example shown in FIG. 5, another example of a "removal" might include the user desiring to remove the circle altogether—to clear the drawing board. The user might enter some command through a user interface which would result in the FMSR including the variable "circle" in the removal section.

With reference to FIG. 1, it will be appreciated that through practice of this example embodiment of the system all of the plurality of client Users A-F can collaborate on the single drawing board file maintained on the network 10, efficiently communicate desired modifications to the network, and efficiently receive updates on modifications that others of the users have made. Through practice of the embodiment of FIG. 7, updates are provided to users only when a modification occurs, and only the modification is communicated to users (as opposed to the entire file). As discussed herein, this achieves significant advantages over the prior art.

It will also be appreciated that embodiments of the present system can be embodied in a multiplicity of different methods, systems and program products to achieve useful benefits and advantages in a variety of different applications. Many example applications include a single shared file on a network is shared between multiple users whom each modify the shared file, including many that are useful in real time collaboration events such as video conferences.

Discussion of several representative of these multiple user collaboration event embodiments is provided below. For the sake of brevity, only brief description of each of several representative embodiments is provided herein below. It will be appreciated, however, that these example embodiments can be practiced using the network configuration described above and in FIGS. 1-3, and that these embodiments are further described through the flowcharts and schematics of FIGS. 4, 5, 7 and 8 and corresponding discussion above. It will therefore be understood that the below summary descriptions of some example embodiments are brief summaries only of particular embodiments of the system as described herein above with reference to FIGS. 1-5 and 6-7. Finally, it will be understood that these examples are not exhaustive of embodiments, and that many others are possible.

User Presence Embodiment

Collaboration event (such as a video conference) user presence applications are one example embodiment. In a video conference occurring using a system as generally described by FIGS. 1-3 a user presence application is useful so that each of the Users A-F have a list of others of the users that are currently present or that are connected to the network 10 and therefore available for participating in the video conference. In systems, methods and program products of the prior art, this often required that a presence engine on the network 10 to constantly poll each of the Users A-F to confirm whether or not they were present. This consumed considerable bandwidth over connections 14, required significant computer resources on the network 10 and at the Users A-F, and otherwise required substantial overhead.

Practice of some embodiments of the system significantly reduce consumption of this bandwidth and other resources. For example, the embodiments of FIG. 4, 5 or 7 may be useful to practice a user presence application running on each of the User A-F computers (FIG. 1) that achieves significant advantages over the prior art. A commonly shared user status file is located on the network 10 (or accessible from the network 10) that includes a list of Users A-F that are currently connected to the network and therefore accessible for conferencing. Whenever a User A-F connects to the network 10, it may send a FMSR to the network (e.g., block 150, FIG. 7) that includes an "addition" of its name to add to the shared user status file. The file will be modified to include that User name, and the version number of the user status file changed (e.g., blocks 152-156, FIG. 7).

Referring to FIGS. 1 and 4 in combination to 7, other Users A-F already connected to the network 10 may have sent an FMSR without any addition data to the network 10 requesting to be notified when the user status list changed (i.e., when a new user signed on and was available for conferencing). When the user status file is updated to reflect the addition of a new user name, the status file version number will be changed (e.g., block 156, FIG. 7). This will cause a yes result in block 106, FIG. 4, with respect to FMSR's issued by others of the users. Those others of the Users A-F will then be communicated a confirmation including the users status file "addition" identifying the new user that is connected to the network and available for conferencing (e.g., FIG. 4, dashed line box 105).

The shared user status file can also include other information concerning the various users in addition to simply noting their on-line presence. Information concerning their hardware or software capabilities, security settings, and the like may be provided in the FMSR, stored in the shared users presence file, and communicated to other clients in confirmations.

Still an additional example User Presence embodiment may be illustrated through consideration of example XML formatted communications between a first computer (such as User A-F, FIG. 1) and a second computer (such as computer 12) that occur through this example embodiment.

In this example, a first user ("Jon Swanson") initially logs into a conference server and communicates a request (using, for example, a FMSR) for a copy of the list of users present in the conference. This may be maintained in a shared file on the network 10 (FIG. 1). Because Jon Swanson is the first user joining the conference, the list of users in the shared file is initially empty. Once the user receives the file copy, the user then cancels his FMSR request because he is about to change that list (by adding his name to the user list), which will cause the shared file version number to change. After adding his name to the shared file user list through a POST command, a new FMSR request for changes is communicated. When a second user (Jon Smith) then logs in to the server, the version number of the shared file changes and the first user is notified of the change.

The sequence of steps performed in this embodiment for the first user Jon Swanson is generally as follows, including example XML formatted communications between the user and the server:

1. Initially connect and GET the current shared document (which is empty because the user if the first attendee)—current version number 9:

GET http://one.acme.net:554/presence/users.xml HTTP/1.0
   Authorization: Basic dHKJFvgjghjtYJkniOPhOgkNftdiWw=CSeq: 1
   User-Agent: IOCom_Client/2.0.3
   HTTP/1.0 200 OK
   CSeq: 1
   Content-Length: 63
   Date: Thu, 24 Apr. 2008 15:00:50 GMT
   ETag: "9"
   Server: in SORS/2.0
   <?xml version="1.0" encoding="utf-8"?>
   <users>
   </users>

2. Using an FMSR, use the XML command POST to inform the server that the user should be sent a confirmation when the user list version number changes (using so-called "when none match" logic to compare shared file version numbers—e.g., FIG. 4, block 106) to learn when a new user logs on:

POST http://one.acme.net:554/presence/users.xml HTTP/1.0
   Authorization: Basic dHKJFvgjghjtYJkniOPhOgkNftdiWw=CSeq: 2
   ETag: "9"
   User-Agent: IOCom_Client/2.0.3
   When-None-Match: "9"

3. The user then communicates a CANCEL for the FMSR request since it is about to communicate a modification (to add his name to the user list in the shared file) and therefore cause the version number to change:

CANCEL http://one.acme.net:554/presence/users.xml HTTP/1.0
   Authorization: Basic dHKJFvgjghjtYJkniOPhOgkNftdiWw=CSeq: 2

4. The user communicates an FMSR containing a POST command specifying the modification to the shared file (i.e., add his name to the list of users present), the server makes the modification, changes the shared file version number to 10 and then communicates this new version number 10 to the user in a confirmation:

POST http://one.acme.net:554/presence/users.xml HTTP/1.0
Authorization: Basic dHKJFvgjghjtYJkniOPhOgkNftdiWw=
CSeq: 3
ETag: "9"
User-Agent: IOCom_Client/2.0.3
Content-Length: 507
<?xml version="1.0" encoding="utf-8"?>
<modify>
 <add>
  <users>
   <user id="jswanson@acme.com" timeout="60" read="@acme.com">
    <handle>Jon Swanson</handle>
    <status_code>Available</status_code>
    <status_phrase></status_phrase>
    <mailbox read="jswanson@acme.com"></mailbox>
   </user>
  </users>
 </add>
</modify>
HTTP/1.0 100 Waiting...
CSeq: 2
Date: Thu, 24 Apr 2008 15:00:50 GMT
Server: inSORS/2.0
HTTP/1.0 200 OK
CSeq: 3
Date: Thu, 24 Apr 2008 15:00:50 GMT
ETag: "10"
Server: inSORS/2.0

5. Using an FMSR, the user communicates a an FMSR with a POST command telling the server to notify it "when-none-match" the current version number 10 (i.e., notify when the shared file version number changes, FIG. 4 block 106):

POST http://one.acme.net:554/presence/users.xml HTTP/1.0
   Authorization: Basic dHKJFvgjghjtYJkniOPhOgkNftdiWw=CSeq: 4
   ETag: "10"
   User-Agent: IOCom_Client/2.0.3
   When-None-Match: "10"

6. The user communicates a "keep-alive" (or refresh) request identifying this POST (may be repeated about every 10 seconds) to keep the FMSR request alive:

POST http://one.acme.net:554/presence/users.xml HTTP/1.0
   Authorization: Basic dHKJFvgjghjtYJkniOPhOgkNftdiWw=CSeq: 4
   ETag: "10"
   User-Agent: IOCom_Client/2.0.3
   When-None-Match: "10"

7. The Server communicates a confirmation to the user after Jon Smith logs and the version number of the shared file thereby changes indicating that the new version number is 11, the "when-none-mathc" logic is subsequently satisfied and the server therefore communicates a confirmation to the user together with the modification made to the shared file (Jon Smith added):

HTTP/1.0 200 OK
   CSeq: 4
   Content-Length: 305
   Date: Thu, 24 Apr. 2008 15:01:41 GMT
   ETag: "11"
   Server: in SORS/2.0
   <?xml version="1.0" encoding="utf-8"?>
   <modify>
   <add>
   <users>
   <user id="jsmith@acme.com" timeout="60">
   <handle>Jon Smith</handle>
   <status_code>Available</status_code>
   <status_phrase></status_phrase>
   </user>
   </users>
   </add>
   </modify>

8. The user communicates a new FMSR with a POST command including version 11 to wait for future modifications to the shared file:

POST http://one.acme.net:554/presence/users.xml HTTP/1.0
   Authorization: Basic dHKJFvgjghjtYJkniOPhOgkNftdiWw=CSeq: 5
   ETag: "11"
   User-Agent: IOCom_Client/2.0.3
   When-None-Match: "11"

9. The user communicates a keep-alive or refresh identifying the FMSR POST every 10 seconds to keep it alive:

POST http://one.acme.net:554/presence/users.xml HTTP/1.0
Authorization: Basic
dHKJFvgjghjtYJkniOPhOgkNftdiWw=CSeq: 5
ETag: "11"
User-Agent: IOCom_Client/2.0.3
When-None-Match: "11"

The XML formatted shared file on the network including the current user list has the following general appearance after both users have logged in:

<?xml version="1.0" encoding="utf-8"?>
<users>
  <user id="jswanson@acme.com" timeout="60" read="@acme.com">
    <handle>Jon Swanson</handle>
    <status_code>Available</status_code>
    <status_phrase></status_phrase>
    <mailbox read="jswanson@acme.com"></mailbox>
  </user>
  <user id="jsmith@acme.com" timeout="60" read="@acme.com">
    <handle>Jon Smith</handle>
    <status_code>Available</status_code>
    <status_phrase></status_phrase>
    <mailbox read="jsmith@acme.com"></mailbox>
  </user>
</users>

It is noted that the above presented User Presence example makes use of a cancellation communicated from the user prior to his communication of modification instructions. This can be useful to prevent the server from communicating modification data that the user is already aware of (i.e., that he has joined the conference).

Chat Embodiment

Another example embodiment is an online "chat" application in which multiple participants share text messages in real-time. Referring to FIG. 1, a single shared file on the network 10 might include a series of messages from different of the Users A-f, with each of the Users A-F able to post new messages by modifying that shared file. Each time any of the Users A-F adds a new message, others of the Users A-F need to be notified of the addition.

In this example the shared file could be an XML document containing "message" elements. When a user wants to write a text message to the other users in the meeting, it modifies the shared XML document by appending a new "message" element containing the text to be shared in the additions portion of an FMSR. It may also delete an old "message" element if it wants to limit the size of the XML document to, for example, the most recent 100 messages by specifying the deletion in the Removals portion of the FMSR.

Referring to FIGS. 1 and 4 in combination to 7, other Users A-F already connected to the network 10 may have sent an FMSR without any addition data to the network 10 requesting to be notified when the shared chat file changed (i.e., when a new text message was added). When the chat file is updated to reflect the addition of a new text message, the shared text message file version number will be changed (e.g., block 156, FIG. 7). This will cause a yes result in block 106, FIG. 4, with respect to FMSR's issued by others of the users A-F (FIG. 1). Those others of the Users A-F will then be communicated a confirmation including the shared text message file addition (i.e., the new text message) (e.g., FIG. 4, dashed line box 105).

Shared Document Application Embodiment

Additional multiple user collaboration embodiments of the system include collaboration on a shared word processor, spreadsheet, chart or other application document. The shared word processor or spreadsheet document can be stored on the network 10 (FIG. 1), and can be embodied in a markup language file (such as in an XML document). Modifications to the documents can be made by any of the Users A-F through communication of an FMSR to a server 12. The server 12 will modify the shared file and change the version number corresponding to the file (e.g., FIG. 7, blocks 156-158). The server 12 (FIG. 1) will then send confirmations to any of the other Users A-F that have pending, outstanding FMSR's with the server 12 notifying them of the new file version number and of the modifications that have been made to that new file (e.g., FIG. 4, dashed line box 105).

Shared Browser Embodiment

Another multiple user collaboration embodiment of the system is a shared browser file that maintains a shared URL address referring to a webpage or other location on the interne. It has been discovered that in multi-user collaboration events such as a videoconference it is often useful for one user to share with other users a web address. Reference may be made during a videoconference, for example, to a particular webpage. Sharing the address of that webpage with all other users can be useful so that the other users can see the webpage. An example embodiment of the system is useful to accomplish this.

In this embodiment, a shared browser file in maintained on the network 10 (FIG. 1) that includes a URL address to be accessed by all Users A-F. In some embodiments, the shared file may have sections for each participant with each participant able to put in a web address. Other participants can choose which particular user's browser address to view.

Modifications to the shared browser document can be made by any of the Users A-F through communication of an FMSR to a server 12 (FIG. 1) that includes a new URL or internet address to be shared with other Users. By way of particular example, an XML format FMSR with a specified web address is as follows:

<add>
  <users>
    <user id="achapwes@acme.com" timeout="300">
      <handle> Aron Chapwes</handle>
      <url>http://aron.chapwes.com</url>
    </user>
  </users>
</add>

This FMSR includes the modification to be made to the shared browser file of specifying a new URL element associated for the user name Aron Chapwes.

The server 12 will modify the shared browser file to reflect this new internet address and change the version number corresponding to the file (e.g., FIG. 7, blocks 156-158). The server 12 (FIG. 1) will then send confirmations to any of the other Users A-F that have pending, outstanding FMSR's with the server 12 notifying them of the new file version number and of the modification made to that new shared file (e.g., FIG. 4, dashed line box 105) that informs them what web address user Aron Chapwes is viewing.

Shared Document List Embodiment

Another multiple user collaboration embodiment of the system is a shared document list file that maintains a list of documents (or files) that each User A-F (FIG. 1) makes available for sharing with others of the Users A-F. It has been discovered that in multi-user collaboration events it is often useful for users to share with other users various documents (or files). Users A-F participating in a videoconference, for example, may be engineers collaborating on a new machine design. Each may have blueprints or schematics to share with other participants. These documents may be shared by placing them in a "common" file folder on a local computer for access by others. So that all users have a current list of what is in all other users common file folder, a shared document list file is maintained on the network 10.

Modifications to the shared document list file can be made by any of the Users A-F through communication of an FMSR to a server 12 (FIG. 1) that includes a new document or file name to be shared with other Users. The server 12 will modify the shared document list file to reflect the new document or file names available for sharing with others (e.g., FIG. 7, blocks 156-158). The server 12 (FIG. 1) will then send confirmations to any of the other Users A-F that have pending, outstanding FMSR's with the server 12 notifying them of the new shared document file version number and of the modification made to that new shared file (e.g., FIG. 4, dashed line box 105).

Shared Moderator Embodiment

Another multiple user collaboration embodiment of the system is a shared moderator file that maintains current information provided by a meeting moderator. It has been discovered that in multi-user collaboration events, and particularly large scale meetings with many users, it is often useful for one of the users to act as a moderator of the event. The moderator may provide some degree of organization to the meeting by directing the discussion, choosing topics, changing the subject, asking questions, choosing speakers or exhibits, setting time limits, and the like. As such, it can be useful for the moderator to send messages, data, or other information to all other users.

It has been discovered that a convenient and efficient manner to accomplish this is through use of a shared moderator file on the network 10 (FIG. 1) that all users share. The moderator (who may be, for example, any of the Users A-F (FIG. 1) may post messages for users in the shared file. He may, for example, place text, information or other data to be shared with all other users in the shared moderator file, and the other users then access it.

Modifications to the shared moderator file can be made by the moderator through communication of an FMSR to a server 12 (FIG. 1) that includes new data for the shared moderator file (e.g., a text message that the meeting has been extended by 30 minutes to discuss one additional topic). The server 12 will modify the shared moderator file to reflect the new text message for sharing with others (e.g., FIG. 7, blocks 156-158). The server 12 (FIG. 1) will then send confirmations to any of the other Users A-F that have pending, outstanding FMSR's notifying them of the new text message in the shared moderator file (e.g., FIG. 4, dashed line box 105). In some shared moderator file and other embodiments of the system, the server 12 (FIG. 1) may allow modification of the shared moderator file only by a designated one or more of the Users A-F (i.e., the designated moderator).

Shared Hardware Embodiment

Another multiple user collaboration embodiment of the system is a shared hardware file that maintains current information on hardware such as cameras 18 and microphones 20 at each of User A-F (FIGS. 1-3) that are available for remote control. It has been discovered that in multi-user collaboration events it can be desirable to offer remote control of some hardware at one or more Users A-F. By way of example, in a large collaboration session where each of Users A-F have multiple cameras 18 at their facility, one or more of the Users A-F may allow for one or more cameras 18 at each of their locations to be remotely controlled by one or more of the other Users A-F. Thus User F may remotely direct one of the cameras 18 at User A to pan, tilt, change focus, or the like.

It has been discovered that a convenient and efficient manner to accomplish this is through use of a shared hardware file on the network 10 (FIG. 1) that includes a list of hardware that is available for remote control. Each camera 18 and microphone 20 may have a unique address. Each User A-F may specify in an FMSR a list of hardware such as cameras and microphones at their location that they are offering for remote control. Other information may be provided, including the unique address for each piece of hardware, and various properties for each piece or hardware (e.g., information useful for remote control).

The server 12 will modify the shared hardware file to reflect the hardware identified in an FMSR as being available for remote control and change the version number of the shared hardware file (e.g., FIG. 7, blocks 156-158). The server 12 (FIG. 1) will then send confirmations to any of the other Users A-F that have pending, outstanding FMSR's notifying them of the new file version number and of the modification made to that shared hardware file including newly identified (or deleted) hardware that is available for remote control by others (e.g., FIG. 4, dashed line box 105).

Some shared hardware control file embodiments of the system also allow for other users to specify the remote control actions they desire. This can be accomplished by other Users sending an FMSR to the shared hardware file with instructions for particular pieces of hardware. For example, User F could communicate an FMSR with directions to make User A's camera 1 to pan 30° to the right. If User A had an outstanding FMSR with the server 12, a confirmation would then be sent to User A with this modification, and upon receipt at User A camera 1 would be directed to pan 30°.

By way of further illustration of one particular such embodiment, below is example XML format communications between a client and server for sharing and remotely controlling a camera at one user location. In the below FMSR, user "achapwes" communicates information about himself and his cameras that are available for remote control.

```
<cam>
  <users>
    <user id="achapwes@acme.com" timeout="300">
      <name>Aron Chapwes</name>
      <cameras>
        <camera id="0">
          <name>Desktop Camera</name>
        </camera>
        . . .
      </cameras>
      <mailbox read="achapwes@acme.com" />
    </user>
  </users>
</cam>
```

Then, when another user "jswan" wants to control this camera at user achapwes, they can do so by writing a "message" object to user achapwes's "mailbox" as provided below. Note that this exchange includes a security password "passphrase" for allowing access.

```
<add>
  <cam>
    <users>
      <user id="achapwes@acme.com">
        <mailbox>
          <message id="<guid>" timeout="300">
            <from>jswan@acme.com</from>
            <subject>Zoom-In</subject>
            <passphrase>secret</passphrase>
            <camera_id>0</camera>
          </message>
        </mailbox>
      </user>
    </users>
  </cam>
</add>
```

User achapwes then acknowledges receipt of the message by deleting it from his shared file:

```
<remove>
  <cam>
    <users>
      <user id="achapwes@acme.com">
        <mailbox>
          <message id="<guid>" />
          </message>
        </mailbox>
      </user>
    </users>
  </cam>
</remove>
```

As will be appreciated through consideration of this embodiment of the system, the present system is not limited to providing updates and modifications directed by individuals. FMSR's and confirmations may communicated to and from directly with hardware and/or software devices. Accordingly, as used herein the term "user" will be broadly interpreted. By way of example, it will be appreciated that embodiments of the system may be practiced by process based hardware devices such as cameras that communicate FMSR's and receive confirmations directly.

Shared Mailbox Embodiment

Another embodiment of the system is a shared mailbox file that maintains shared information on any number or aspects of each user. The shared mailbox file may be viewed as a "catchall" or "utility" file used to store multiple different elements of information concerning various of the users, their hardware or software settings, and the like. A single shared mailbox file may have sections for each user and contain information about different aspects of each user in their sections. By way of example, the shared mailbox file stored on the network 10 might combine the functionality of the user presence embodiment, the shared hardware embodiment, the shared document embodiment, and the chat embodiment.

In such an embodiment, the shared mailbox file includes sections for each of Users A-F, with sections added or removed for particular users based on FMSR's they communicate to the server. Accordingly, the presence or absence of a user in the shared file indicates whether they are attending the meeting and thereby provides the functionality of the user presence embodiment.

In this example, each user section of the shared mailbox file also includes a list of documents or files specified by the particular user for sharing with others, a list of hardware specified by the particular user for remotely controlling by other users, and any text messages that the user wishes to add to a shared chat board. Whenever any one user modifies the shared mailbox file (e.g., by adding a new text message through communicating an FMSR), the server communicates a confirmation to all other users notifying them of the modification and including the change.

Consideration of the various above described example embodiments highlights still another advantage of the system related to ease implementation and support of new applications. In many prior art systems, methods and program products, each of the above applications (if they existed) and other applications that required multi-user sharing of single file were configured as stand alone applications. Each was required to be implemented and installed on both the client and server side. Thus, for example, if a video conference system of the prior art desired to implement a user presence engine, a chat application, and a hardware remote control application (if such a system existed), each may be required to be implemented separately as stand-alone applications. Each might require its own client and server side software, and each consumed bandwidth, memory and other computing resources.

Embodiments of the present system achieve significant advantages and benefits over this prior art by providing a single ubiquitous platform for supporting any number of shared file applications. Put another way, embodiments of the system may be viewed as a shared file application "engine" that can support any desired number of shared file applications. With reference to the flowcharts of FIGS. 4, 5, 7 and 8, the FMSR, shared file, and confirmations can contain information directed to any desired shared file application. The FMSR, shared file, confirmation, and embodiments are not application specific—they can be used to support any desired shared file application, and further can support multiple applications simultaneously. All that necessarily changes between the different applications is particular information placed in the FMSR and confirmation (e.g., file identifiers, variable names in the FMSR and confirmation, etc.) and perhaps a different user interface at the User A-F.

Figure 9:
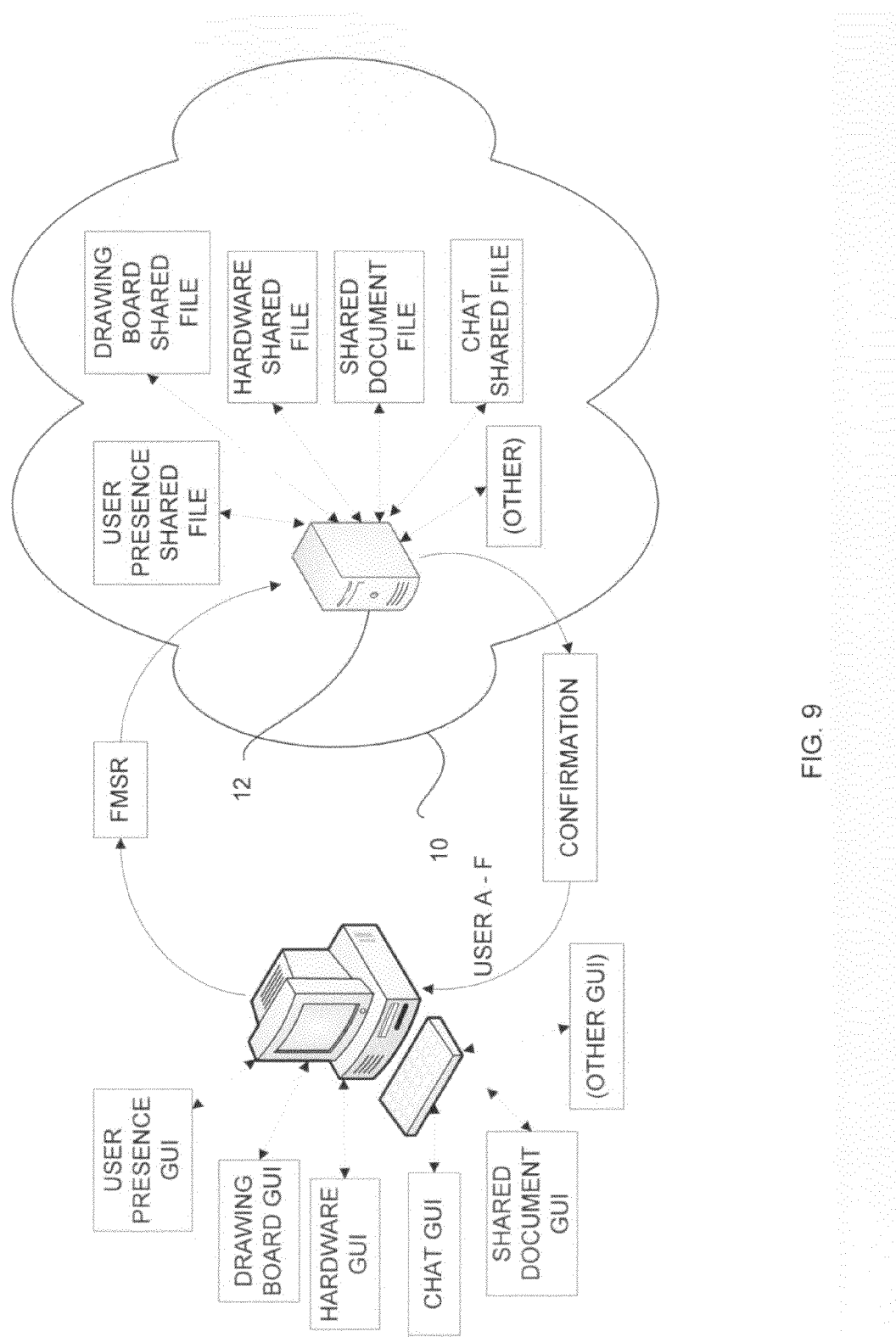
FIG. 9 is an alternative schematic of a network useful to illustrate example embodiments.

Accordingly, still another embodiment of the system is a shared file application platform or engine that supports a plurality of different shared file applications. Reference to the schematic of FIG. 9 is useful to further illustrate this embodiment of the system. In FIG. 9, a client computer (which may represent, for example, any of the Users A-F of FIG. 1-3) has graphic user interfaces running for multiple different shared file applications. Likewise, the network 10 has shared files for each of these various applications. Modifications to any of these files may be made through practice of methods, systems or program products according to the flowcharts of FIGS. 4, 5, 7 and 8. Confirmations and information on the modifications made are communicated to the users in the manner described in those FIGS.

A valuable advantage of this and other embodiments of the system is that the process operating at the client and server computer is a single engine that achieves the shared file updates and confirmations. As the number of applications being supported grows, tremendous savings in bandwidth, memory, processor, and other computational resources are gained. Further, significant gains in stability are likewise achieved since only a single engine is operating.

Another significant advantage over the prior art is ease of implementation of new shared file applications. Referring again to the schematic of FIG. 9, should a new shared file be desired to be launched, all that is required is that a new GUI be installed at the client and new shared file stored on the network 10. Changes or additions need not be made, however, to the underlying engine that drives file modifications and confirmations (as described, for example, by FIGS. 4, 5, 7, and 8) since this engine is not application specific. No additional software is required on the server side (other than storing a new shared file).

Referring to FIG. 9, it will be noted that in some embodiments of the system the various GUI's could be combined into a single GUI, and further that the various shared files on the network 10 could be combined into a single file having multiple portions. This could be packaged, for example, as a single shared "mailbox" file as described herein above.

Embodiments described above have generally included a file being shared during a collaboration event such as a video conference. Although various embodiments of the system have proven to be of particular utility in such applications, these are but one set of embodiments. Other embodiments will prove useful in other applications unrelated to video conferences or collaboration events.

For example, other embodiments of the system will be of value in applications that include, by way of example (and not by way of limitation) network communications of gaming, financial markets, maps, weather, media, and many others. Many of these applications generally have in common that they include one or more of the following factors: a relatively large, shared file that changes; the size of the changes are small relative to the size of the file; multiple users are notified of the changes; and such notifications should occur promptly after they occur (e.g., substantially real time).

Figure 10:
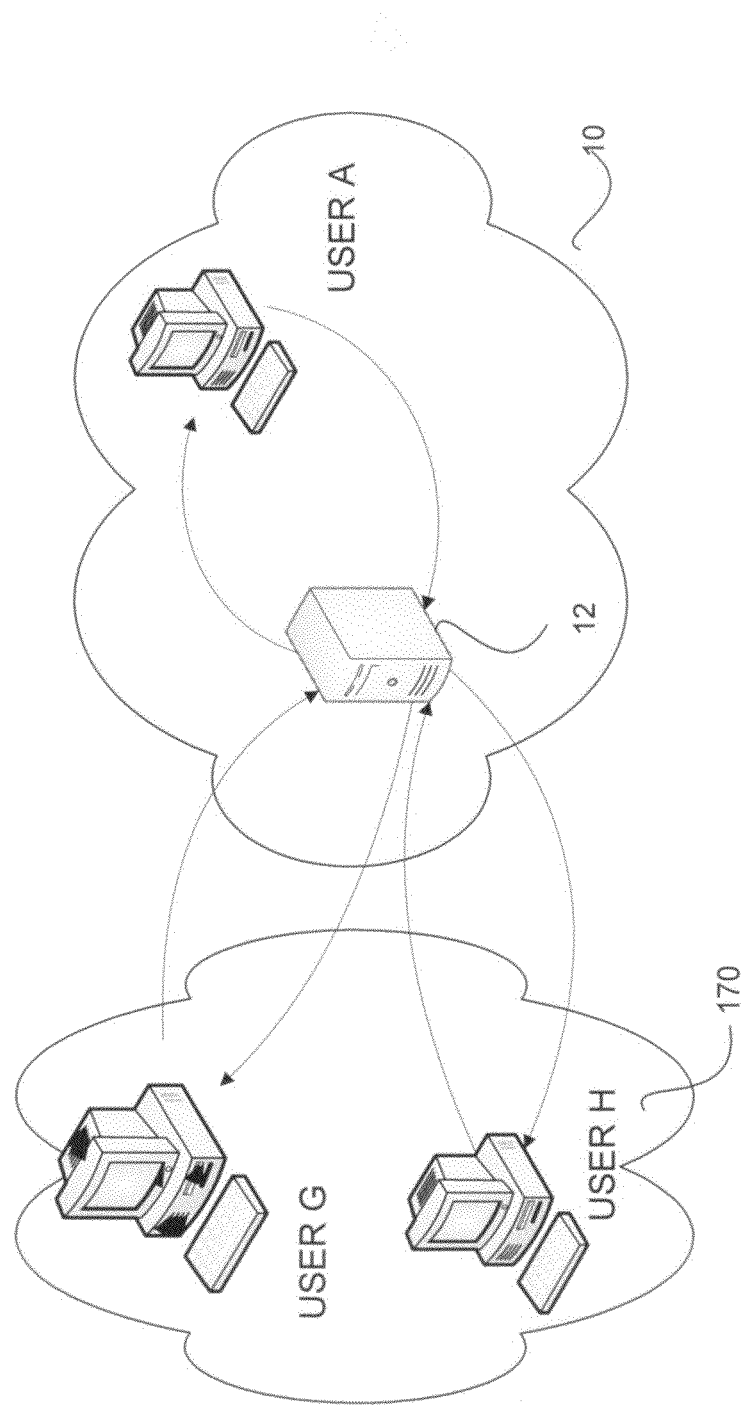
FIG. 10 is an additional schematic of a network useful to illustrate example embodiments.

One such example is reflected in the schematic of FIG. 10, where a User A and her computer are interconnected to the first data network 10, and Users G and H and their computers are interconnected to a second data network 170. User A transmits data to, and receives data from, the server 12 via the first data network 10. Thus, the Users G and H transmit data to, and receive data from, the server 12 via the second data network 170. The server computer 12 facilitates communication among Users A, G and H. While the server computer 12 is shown as part of the data network 10 the server may, of course, alternatively also be a part of the distinct data network 170.

In the example embodiment shown in FIG. 10, the data network is the Internet, and the second data network is a fast version of the Internet, such as the Grid being developed at CERN, as discussed previously. In alternative embodiments, of course, each of the different data networks 10, 170 could be a LAN, WAN, or wireless network.

The use of the methods, program products and devices of the present invention are particularly suited to such an environment, where one data network is substantially faster than the other. Prior methods of updating a file include transmitting a new version of substantially the entire file when the file has been modified. Such an approach may be acceptable when all client computers download the file at approximately the same time. When, however, User G modifies the file and User H downloads the new version of the file substantially earlier than User A (because, for example, the data network 170 is faster than the data network 10 and the file is relatively large), communications between User A and Users G and H may be compromised. With the benefit of embodiments of the present system, however, only the file modifications need be communicated to the Users. Thus, while the modifications make take longer for User A to download than User H, both Users A and H view the modified document at closer to the same time because only the file modification has been downloaded rather than the entire file. Also, embodiments of the present methods allow for updates to be communicated only when a modification occurs.

Figure 11:
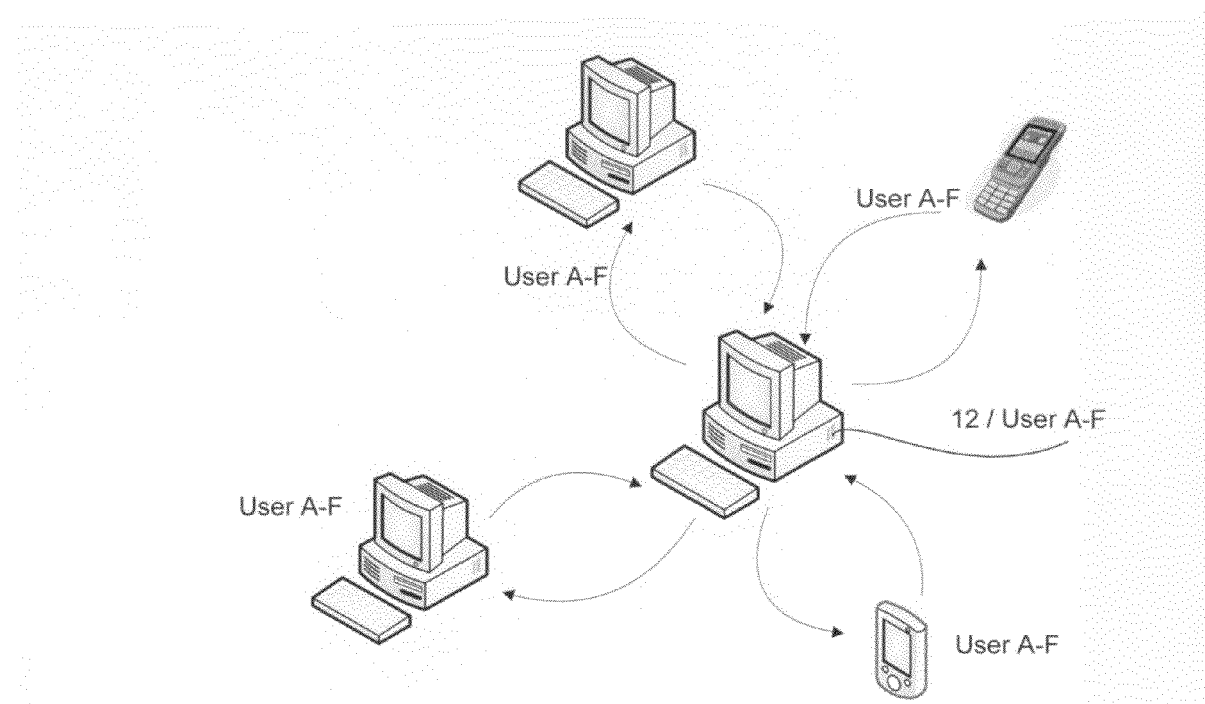
FIG. 11 is an additional schematic of a computer configuration useful to illustrate example embodiments.

As shown in the example embodiment of FIG. 11, the server computer 12 is also a client computer (e.g., FIG. 1 User A-F) and, like the other client computers, may receive inputs for modification of a file. Also, as shown in the example embodiment of FIG. 11, the client computers may be wireless devices.

The server computer 12 maintains a master file and a master file identifier corresponding to the master file. However, the server computer 12 may physically maintain the master file either within the server computer 12 or it may maintain the master file on a separate memory storage device, including, for example, one of the other client computers or a network accessible location.

Figure 12:
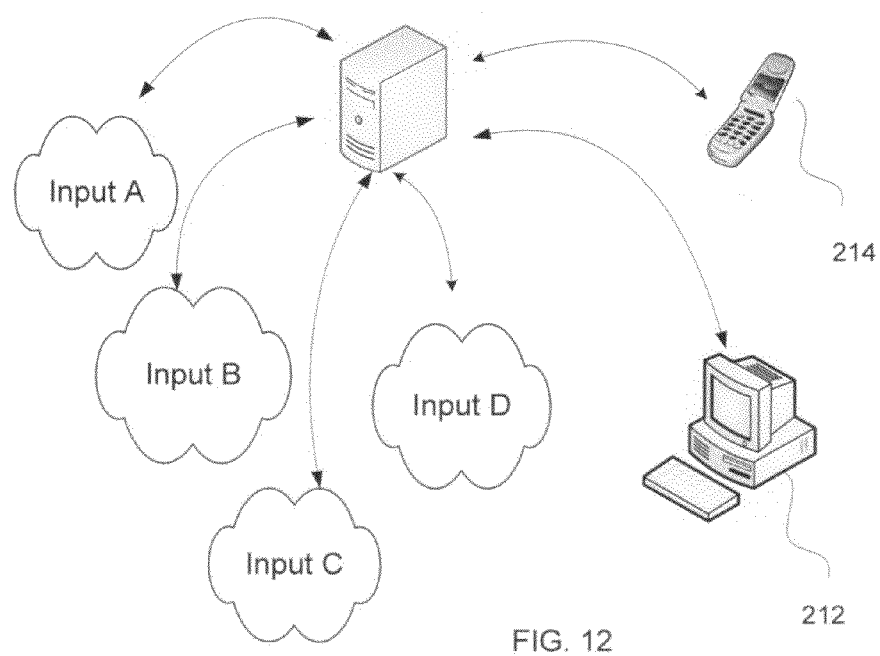
FIG. 12 is an additional schematic of a computer and data input configuration useful to illustrate example embodiments.

In the example embodiment of FIG. 12, the server computer receives Inputs A, B, C, and D from a variety of sources, each of which includes a client computer. The server computer may also communicate with other client computers via a wired network, a wireless network, or both.

In one example embodiment, Inputs A-D are computerized controllers for machines within a factory, and the server computer maintains a master file corresponding to the condition of the various machines within the factory. The file is updated in a shared file, which can be viewed remotely from the machines via, for example, a personal computer or wireless device.

Embodiments of the invention are not limited to traditional stand-alone computers, communication devices and the like communicating with one another. In some embodiments of the invention, the various users and "computers" may be components of a single larger system. For example, another embodiment is reflected in FIG. 12 wherein the Inputs A-D are local area networks in a single system. They may be, for example, local area networks on a vehicle such as an automobile, semi-tractor and trailer, airplane, earth mover, crane, or the like. Such vehicles typically have a variety of different local area networks on it devoted to, for example, a braking system, a fuel system, engine operation, electrical power, etc. The LANs on the vehicle can all communicate to a computer server 212.

A master file corresponding to the conditions of various vehicle components is periodically updated with a file modification to reflect the current conditions of the various vehicle components. The master file setting forth the status of the various components on the vehicle may than be shared with other computers that are remote from the vehicle, including for example a mobile device 214. One or more of the inputs A-D and the mobile device may communicate FMSR's to the server 212 requesting to be updated when the master file changes, with the result that a confirmation will be sent to it when its version number changes.

Figure 13:
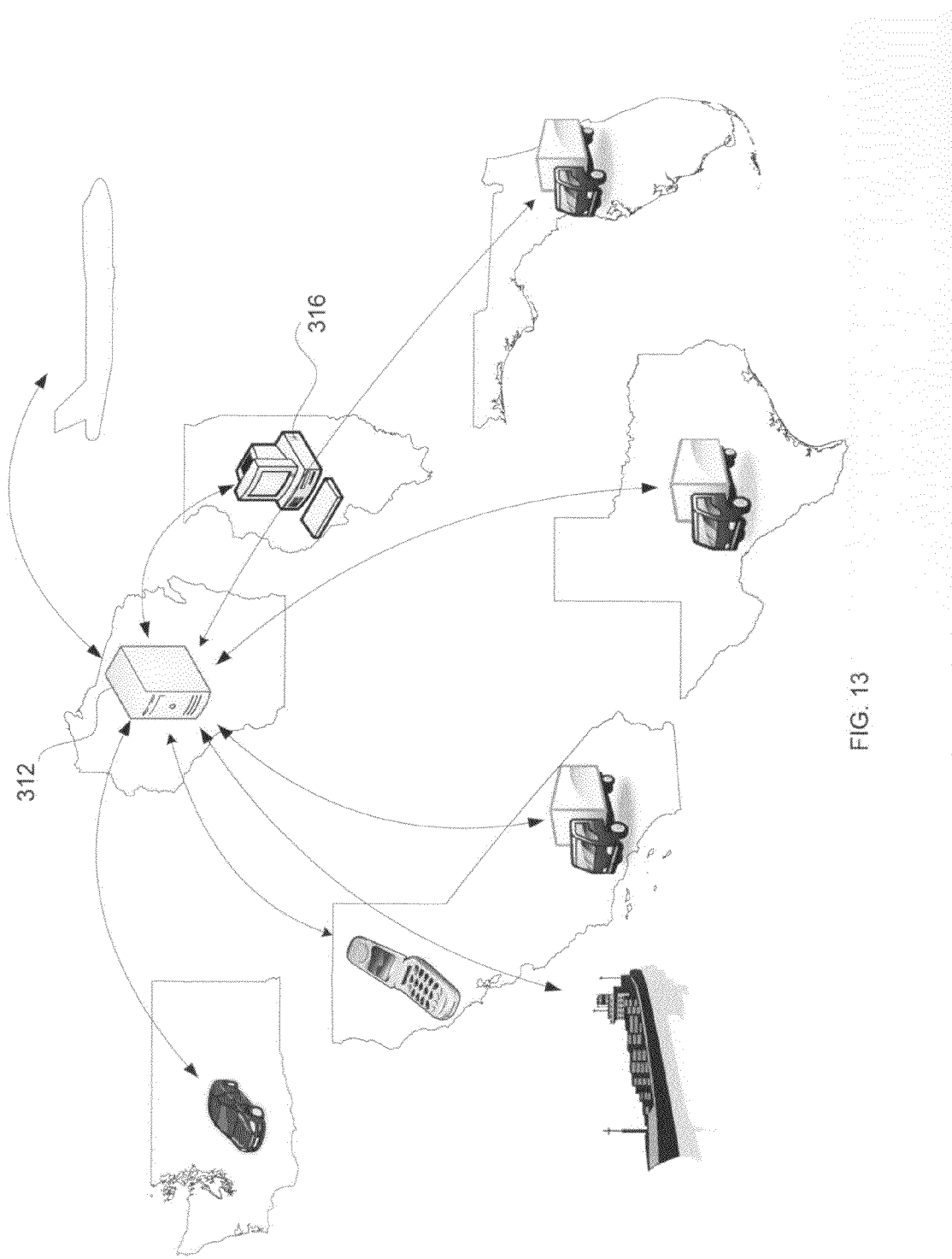
FIG. 13 is an a schematic of a computer and data input configuration useful to illustrate example embodiments.

In the example embodiment of FIG. 13, the client computers include location monitors associated with members of a transport fleet, where the fleet may include, for example, trucks, automobiles, planes, and ships moving about in different and distant geographic locations across the United States and elsewhere. The file being shared is stored on computer 312 reflects the current location and condition of each of the members of the transport fleet, and the updates to the file include data pertaining to the location or condition of such members of the transport fleet. Each member of the group may obtain current location data using a satellite and communicate the same to the computer 312.

Thus, for example, an on-board client computer may issue a FMSR if, for example, the associated truck breaks en route to its destination. Further, a remote user 316 could, by reviewing the updated file, know the current position of all members of the fleet. Or, one member of the group may request an update of the master file regarding the time a particular other member of the group reaches a particular destination so that an interdependent shipment schedule can be off-loaded. Methods, systems and program products of the invention, including those illustrated by FIGS. 4, 5, 7 and others will be useful to efficiently achieve these and other results.

Figure 14:
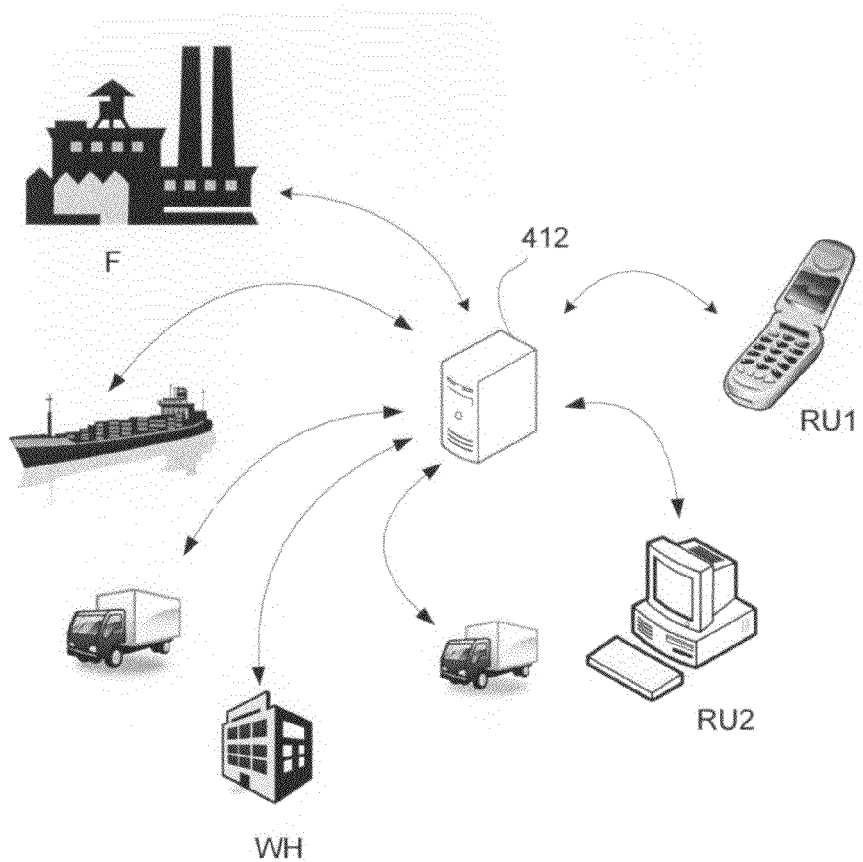
FIG. 14 is an additional schematic of a computer and data input configuration useful to illustrate example embodiments.

According to the example of FIG. 14, the shared file includes a listing of the status or location of units of inventory for a business, including inventory found at a factory F, being transported via ship or truck and stored within a warehouse WH. Master updates of the shared file reflect data on the current location of all inventory. A remote user RU1 or RU2 sharing the document would be able to identify the location of all inventory and coordinate a supply chain in an efficient manner.

Figure 15:
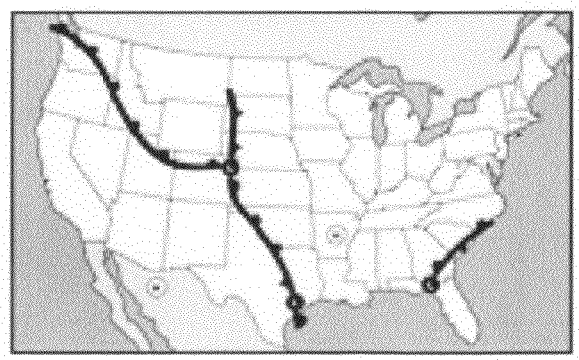
FIG. 15 is a representation of a file that may be used with example embodiments.

In the example of embodiment of FIG. 15, the shared file pertains to weather conditions, and the master update includes data pertaining to changed weather conditions. The document being shared by the system is reflected in FIG. 15, where real time updates reflect the current locations of high fronts and storms and their direction of movement, atmospheric pressure, wind speed and direction, as well as current estimates of anticipated temperatures.

Figure 16:
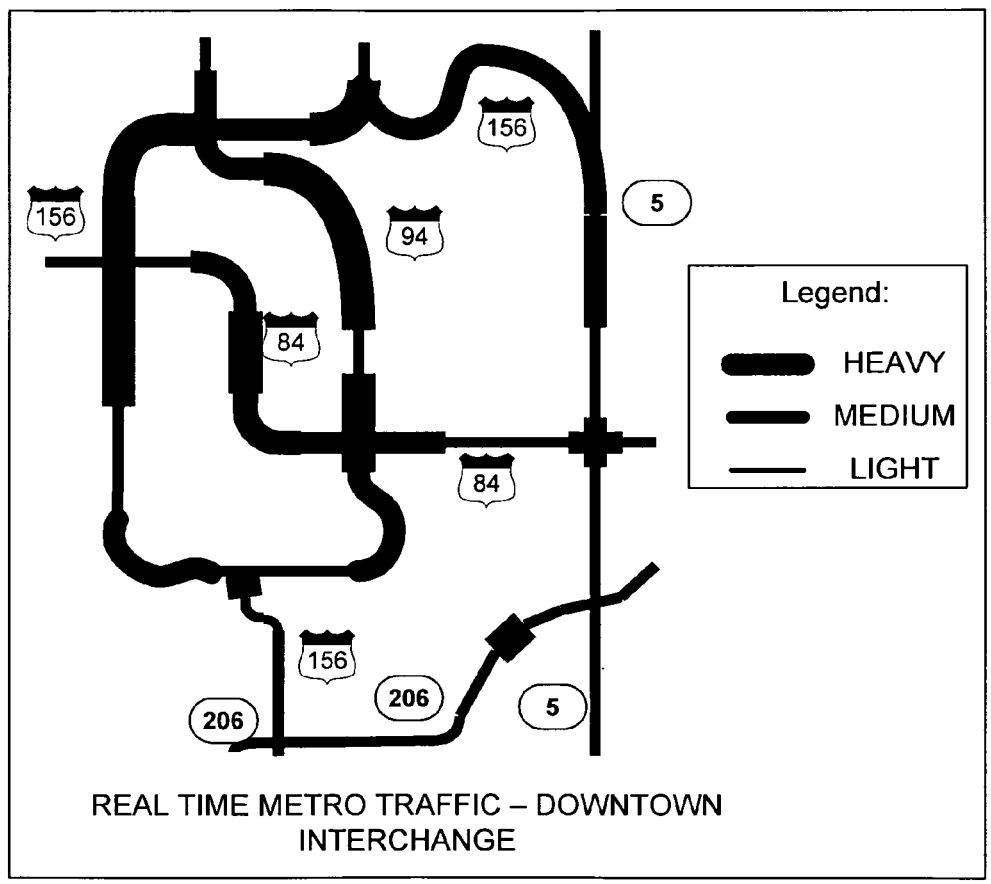
FIG. 16 is a representation of an additional file that may be used with example embodiments.

In another example embodiment, a file may reflect the location of objects. In the example embodiment of FIG. 16, the file pertains to a map with the location of streets and points of interest in a particular area. The updates include, for example, data on current traffic conditions. The file reflected in FIG. 16 is a map with bars and lines superimposed on streets to reflect various levels of traffic flow.

Figures 17, 18:
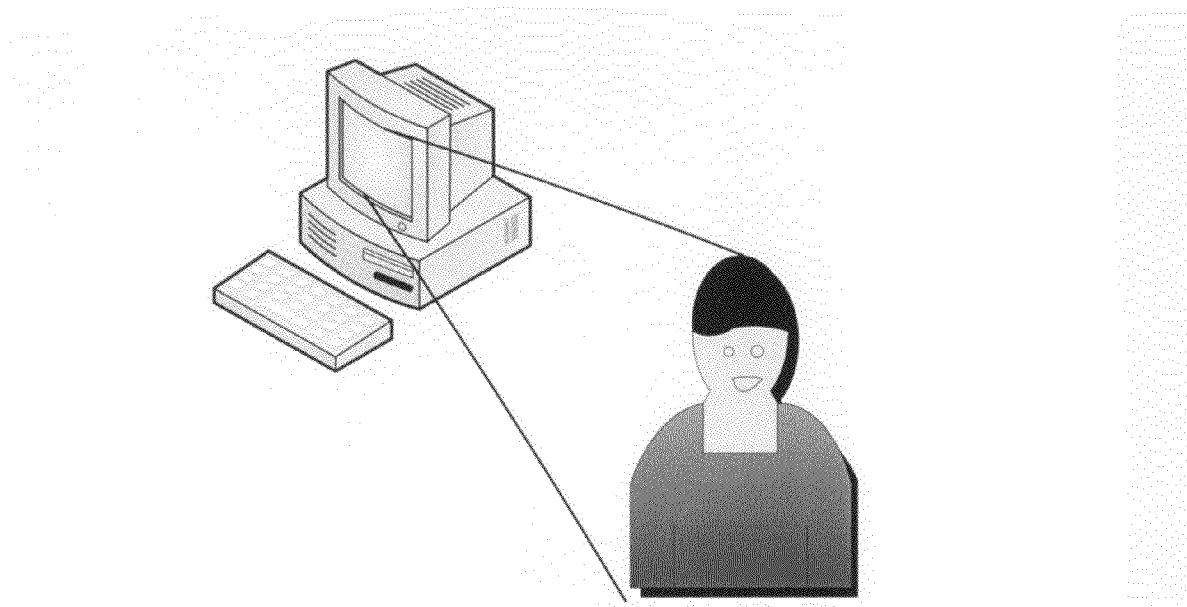
FIG. 17 is a representation of an additional file that may be used with example embodiments.
FIG. 18 is a representation of an additional file that may be used with example embodiments.

In the example embodiment shown in FIG. 17, the file may also contain a video or animated image, where updates reflect changes to a relatively small portion of the image. Thus, in the example shown in FIG. 17, an animated figure such as a cartoon character is shown. Portions of the character such as the hair, hands, and torso may move and change position very little from frame to frame during a particular sequence. Other portions, with an example being the face and particularly mouth, may change position and shape significantly during this same sequence. In this context, the updates include data pertaining to the real-time position of the lips and face.

In an example of a financial market application, a user may have a set of stocks or commodities for which she desires real-time updates. The universe of stocks that the user has in interest in may be relatively large. In this case, the file consists in a listing of such stocks, together with relevant information regarding the stock, such as, for example, its price, trading volume during a preceding time period, beta, first derivative price slope, etc. Through practice of a system such as that illustrated in FIG. 4, 5 or 7-9, that user can be notified only when one of the stocks or commodities and/or one of the properties of the selected stock in her set of interest changes, and further he may be provided with only the changed price or other property of the one stock or commodity has changed. As in several, but certainly not all, other examples employing the system, the entire file typically includes at least ten times as much data as the file modification. In some examples, the entire file may include at least 100 times the data as is contained in the modification.

Thus, in example shown in FIG. 18, financial information properties are disclosed for a variety of companies of interest to the user. In the specific embodiment shown in FIG. 18, the file includes data pertaining to the price of particular stocks, and the master update includes data on recent price changes.

In the example embodiment reflected in FIG. 19, the file includes a variety of news reports as might be found in an electric newspaper. The updates include data representing current news stories which can be added to, or replace, existing news stories. Thus, for the example of FIG. 19, the file includes 50 news stories. When a newsworthy event occurs, News Report #1 may be deleted and replaced with another News Report.

In the example embodiment reflected in FIG. 20, the file may be a personnel data base for employees of a business. Thus, in the example of FIG. 20, the file includes employee names and identification numbers, and the more frequent updates pertain to the employees' current level of overtime. A remote user viewing the file of FIG. 20, however, may prefer to have the data base sorted in a different manner, such as by the current location of the employees, rather than by an alphabetical listing of the employees' names. The example file of FIG. 21 reflects the same essential document of FIG. 21, but the data has been reconfigured by the specific client computer of the user to reflect the user's viewing preference. The adjustment of the data base shown in FIG. 21 may be communicated to the server computer 12 as a new version of the file or, alternatively, may simply be shown by the remote user's client computer, without the revised file being shared with other client computers.

Generally, many of the present methods, systems and program products relate to communicating file modification between at least two computers over a data network. The system includes the steps of a first computer communicating a file modification status request to a second computer, with the status request including at least a file identifier and a file version identifier. The second computer uses the file identifier from the status request to identify a current version number of a corresponding shared file. The second computer then compares the current file version number to the file version identifier from the status request and communicates a response to the first computer when the current version number does not match the version identifier from the status request.

Those knowledgeable in the art will appreciate the broad scope of the present invention as claimed below and that the representative collaboration event and video conference examples discussed herein are illustrative only. It will further be appreciated that many variations are possible within the scope of the invention as claimed herein below. The sequence of steps of the example embodiments illustrated herein and in corresponding flowcharts, for example, could easily be altered. Also, some steps may be omitted and others substituted. Equivalents to the steps recited will be apparent to those knowledgeable in the art. Variable, file, and other element names have been used herein for convenience only, and these names should not be interpreted in a manner that unduly limits the invention.

What is claimed is:

1. A method for communicating a file modification among at least at least five computers over a data network, each of the at least five computers corresponding to a participant in a video conference occurring over the network, wherein at least one server facilitates communications among the at least five participants and each of the at least five first computers has a user presence application for listing others of the first computers that are participating in the video conference, wherein the file comprises one or more shared files that may be accessed and modified by any of the at least five participants, the one or more shared files collectively contain a list of the at least five participants that are participating in the video conference, the method comprising:

a first computer communicating only one file modification status request to a second computer until the first computer receives a modification confirmation, the status request including at least a file identifier and a file property;

the second computer using the file identifier from the request to identify a current property of a corresponding file; and, the second computer comparing the current file property to the file property from the status request and communicating a modification confirmation to the first computer only when the current property does not match the property from the status request.

2. A method for communicating file modification as defined by claim 1 wherein the shared file is being shared by a plurality of users simultaneously participating in a real-time collaboration event wherein any one of the plurality of users can modify the shared file, and wherein the first computer comprises a plurality of first computers corresponding to the plurality of users.

3. A method for communicating file modification as defined by claim 1 wherein:

the first computer comprises a plurality of first computers each participating in a video conference and configured to send and receive video and audio data during the video conference;

the second computer is configured to facilitate communications between the plurality of first computers during the video conference whereby each of the first computers sends and receives video and audio data to all others of the first computers using the second computer;

wherein the shared file comprises one or more files being shared by each of the first computers during the video conference; and, wherein the second computer communicates modifications made to the shared file to the first computer;

wherein the file property is a shared file size that changes when the shared file is modified; and, wherein the second computer continually compares the current file property to the file property from the status request until one of either a time-out value is exceeded or the current property does not match the property from the status request.

4. A method for communicating file modification as defined by claim 1 and wherein:

the shared file may be modified by any of a plurality of the first computers; and, the step of the second computer comparing the shared file current file property to the property from the status request is performed only until a time out period expires unless a keep alive request is received from the first computer, the keep alive request identifying the status request.

5. A method for communicating file modification as defined by claim 1 and further comprising the step of the second computer communicating to the first computer all modifications to the shared file that have occurred between the shared file current property and a previous version of the shared file that corresponds to the file property from the status request.

6. A method for communicating file modification as defined by claim 1 and wherein the file property is a file version identifier, the method further including the steps of:

the second computer determining that the file version identifier from the status request corresponds to a previous version of the shared file and that a most current version of the shared file exists that is different from the previous version;

the second computer retrieving a stored copy of the previous version of the shared file and comparing the most current version of the file to the previous version to identify modifications that have been made to the most current version as compared to the previous version;

the second computer communicating to the client the modifications and the current version number from the most current version of the shared file; and wherein at least the first computer and the second computer are client computers.

7. A method for communicating file modification as defined by claim 6 wherein:

the confirmation communicated from the second computer to the first computer comprises a markup language format file including at least a portion for additions and a portion for removals; and, wherein the second computer segments the modifications into additions that correspond to information added to the most current version of the file as compared to the previous version of the file and removals that correspond to information removed from the most current version of the file as compared to the previous edition of the file.

8. A method for communicating file modification as defined by claim 1, wherein the step of the first computer communicating the file modification status request further includes the first computer communicating at least one desired modification to be made to the shared file together with the status request, and wherein the second computer modifies the shared file to include the desired modification and the shared file property changes.

9. A method for communicating file modification as defined by claim 1 wherein the at least one desired modification is segmented into an addition portion and a removal portion to make to the shared file and is formatted in a markup text language.

10. A method for communicating file modification as defined by claim 1 and where the steps of the second computer communicating the confirmation to the first computer when the file has been modified further comprises the second computer comparing the file current property to the file property from the status request at least 30 times before the current property does not match the property from the status request.

11. A method for communicating file modification as defined by claim 1 wherein the property is a shared file version number, and wherein the shared file version number changes upon modification of the shared file.

12. A method for communicating file modification as defined by claim 1 and wherein each of the at least five first computers have a shared hardware application identifying which cameras at others of the at least five first computers are available for remote control, and wherein the at least one shared file on the further includes a list of cameras that are available for remote control during the video conference.

13. A method for communicating file modification as defined by claim 1 wherein:

each of the at least five first computers participating in the video conference have a plurality of shared file applications comprising at least a user presence application, a chat application and a shared document application; and the file modification request can correspond to any of the shared file applications on each of the at least five first computers.

14. A method for communicating file modification as defined by claim 1 wherein the file modification status request includes a distinct portion for additions and a distinct portion for removals, and wherein one but not both of said portions contains at least one desired file modification.

15. A method for communicating file modification as defined by claim 1 wherein the file attribute is selected from a group consisting of a version identifier, a file size, a time stamp indicating a time of a most recent update, and at least a portion of the file identifier.

16. Computer program instructions stored on a non-transitory computer readable medium for managing a shared file that is shared by a plurality of clients participating in a real time collaboration event during which the contents of the shared file is modified, the program instructions when executed causing one or more computers to perform the steps of:
- at least one first client to communicate one and only one modification status request to a server including a file identifier and a file property and no additional modification status requests until after a modification confirmation indicating that the shared file has been modified together with a new current property, wherein said file property is at least one of a version number and a file size;
- the server to receive the modification status request from the at least one first client, to use the file identifier to identify a current property of a shared file, to compare the file property from the status request to the current property and to determine that the status request property matches the current property and therefore to not communicate the modification confirmation to the first client;
- a second client to communicate modification instructions to the server including the file identifier and modifications to make to the shared file;
- the server to use the file identifier received from the second client to identify the shared file, to use the modification instructions received from the second client to modify the shared file whereby the shared file current property changes; and,
- the server to determine that following modification of the shared file the current property no longer matches the file property included in the modification status request received from the first client and therefore to communicate to the at least one first client the modification confirmation indicating that the shared file has been modified together with the new current property.

17. Computer program instructions for managing a file that is shared by a plurality of clients as defined by claim 16 and wherein the program instruction further cause the server to:
- compare the shared file current property following modification by the second client to a previous version of the shared file that corresponds to the file property received from the first client to identify all modifications of the newest version as compared to the previous version of the file; and,
- wherein the step of the server communicating the first confirmation to the at least one first client with the current property further includes the server communicating the modifications to the at least one first client.

18. Computer program instructions for managing a file that is shared by a plurality of clients as defined by claim 17 wherein the program instructions further cause the server to segment the modifications into an addition portion and a removal portion, wherein the confirmation is configured as a markup text language, and wherein the at least one first client comprises a plurality of first clients.

19. Computer program instructions for managing a file that is shared by a plurality of clients as defined by claim 16 and wherein the file comprises a user presence file including a list of the plurality of clients that are available for conferencing, and wherein the modification communicated by the second client includes addition of the second client to the list of users available for conferencing.

20. Computer program instructions for managing a file that is shared by a plurality of clients as defined by claim 16 wherein the shared file property is a shared property version number, wherein the shared file property changes upon modification of the shared file, and wherein the server stores at least the previous five versions of the shared file.

21. A method for modifying a shared user presence file that includes a list of users that are on-line and available for conferencing during a video conference, the method comprising:
- a first user initiating the videoconference and communicating instructions to a second computer to modify the shared user presence file by adding the first user name to the shared user presence file, the shared user presence file having a file identifier and being assigned a first file version identifier following the modification;
- the first user communicating a file modification status request to the second computer, the file modification status request including at least the file identifier and the first file version identifier;
- the second computer using the file identifier from the file modification status request and the first file version identifier to identify a current version of the shared user presence file;
- the second computer continually checks a version number of the shared user presence file to determine if the checked version number matches the first file version identifier until a time-out value has been exceeded;
- the first computer communicates a keep-alive request to the second computer to cause the second computer to continually check the shared file version number beyond expiration of the time-out value;
- a second user joining the video conference;
- the shared user presence file being modified to include a name of the second user with a second file version identifier assigned to the shared user presence file following modification;
- the second computer to determine that the second file version identifier does not match the first file version identifier included in the file modification request received from the first user;
- the second computer comparing the shared user presence file to a previous version of the shared user presence file that corresponds to the first file version identifier to identify modifications made to the shared user presence file; and,
- the second computer communicating the modifications made to the shared user presence file only to the first computer.

* * * * *